United States Patent
Delaney et al.

(10) Patent No.: US 6,678,809 B1
(45) Date of Patent: Jan. 13, 2004

(54) WRITE-AHEAD LOG IN DIRECTORY MANAGEMENT FOR CONCURRENT I/O ACCESS FOR BLOCK STORAGE

(75) Inventors: William P. Delaney, Wichita, KS (US); Donald R. Humlicek, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 247 days.

(21) Appl. No.: 09/834,368

(22) Filed: Apr. 13, 2001

(51) Int. Cl.[7] .............................................. G06F 12/00
(52) U.S. Cl. ........................ 711/162; 711/141; 707/204
(58) Field of Search ................................ 711/162, 161, 711/141; 707/200, 202, 204

(56) References Cited

U.S. PATENT DOCUMENTS

| | | |
|---|---|---|
| 5,664,186 A | 9/1997 | Bennett et al. |
| 6,119,131 A | 9/2000 | Cabrera et al. |
| 6,237,008 B1 | 5/2001 | Beal et al. |
| 6,338,123 B2 | 1/2002 | Joseph et al. |
| 6,366,988 B1 | 4/2002 | Skiba et al. |
| 6,374,268 B1 | 4/2002 | Testardi |
| 6,490,594 B1 * | 12/2002 | Lomet ........................ 707/200 |

OTHER PUBLICATIONS

C. Mohan, et al., ARIES: A Transaction Recovery Method Supporting Fine–Granularity Locking and Partial Rollbacks Using Write–Ahead Logging, ACM Transaction on Database System, vol. 17, No. 1, Mar. 1992, pp. 94–162.

* cited by examiner

Primary Examiner—Kimberly McLean-Mayo
(74) Attorney, Agent, or Firm—John R. Ley LLC

(57) ABSTRACT

Block-level storage is managed in a computerized storage system by recording into a write-ahead log a description of block-level updates made to data in a volume in a main memory and in a storage device of the computerized storage system. The write-ahead logging enables directory updates for each block-level write request to be logged, so the write request can be allowed to complete independently of other write requests.

6 Claims, 18 Drawing Sheets

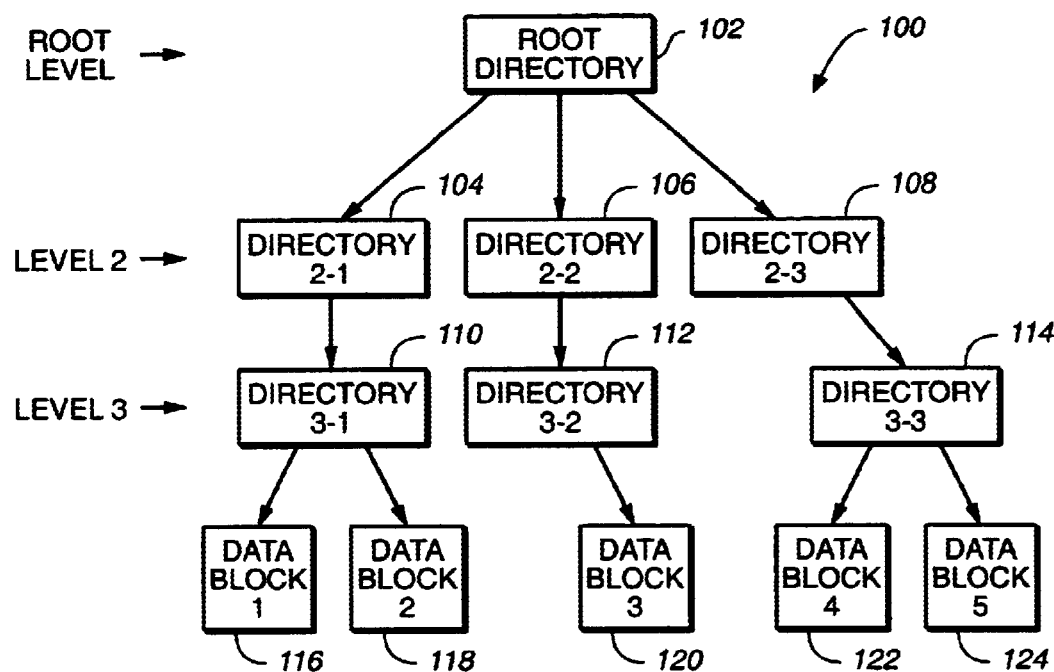
FIG._1 *(PRIOR ART)*
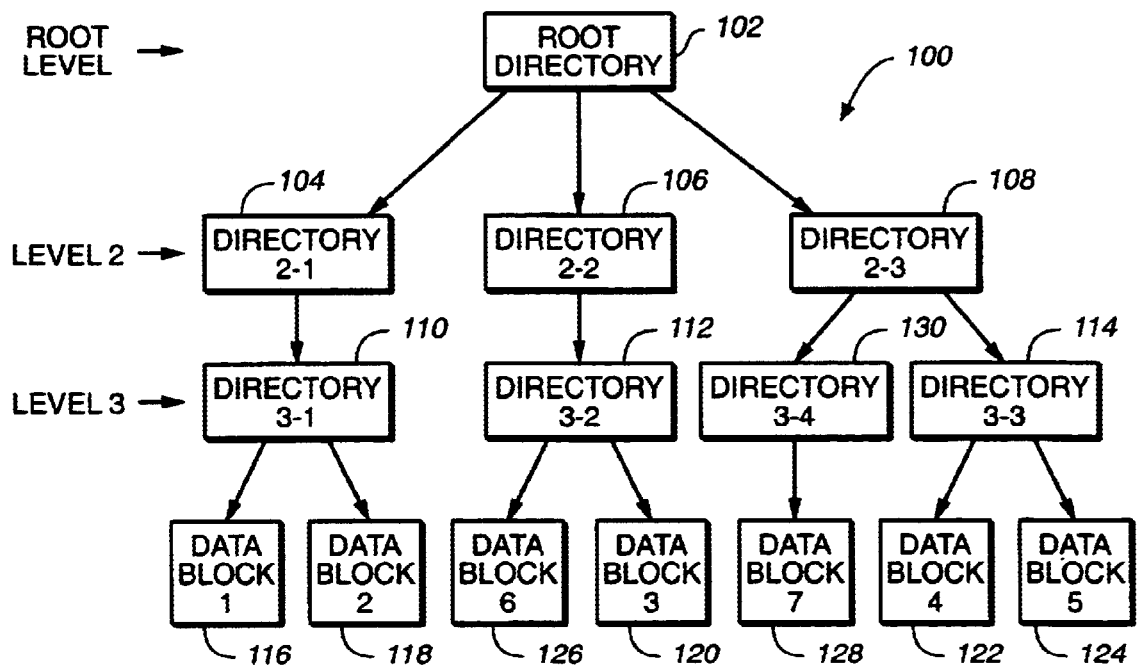
FIG._2 *(PRIOR ART)*

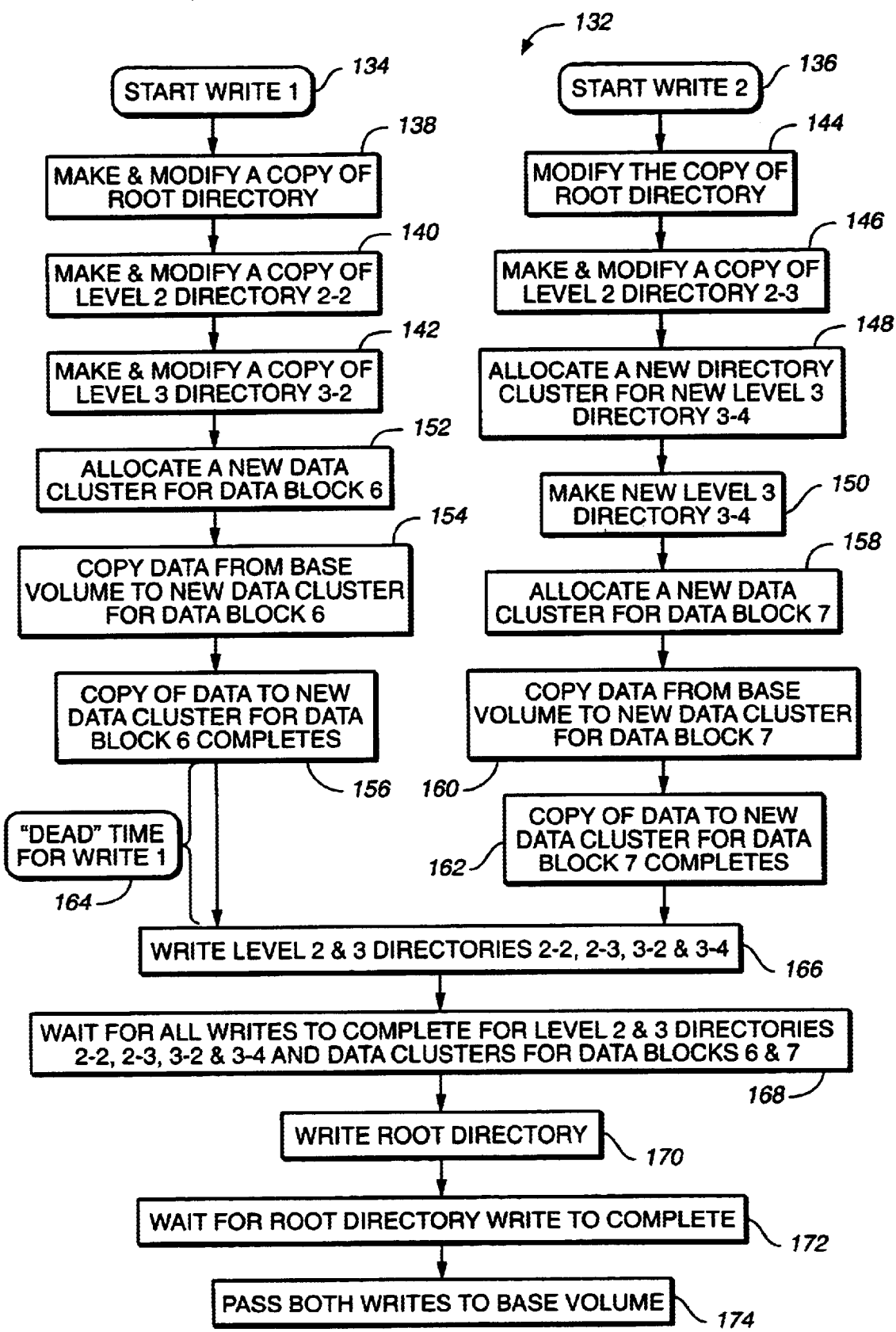
FIG._3 *(PRIOR ART)*

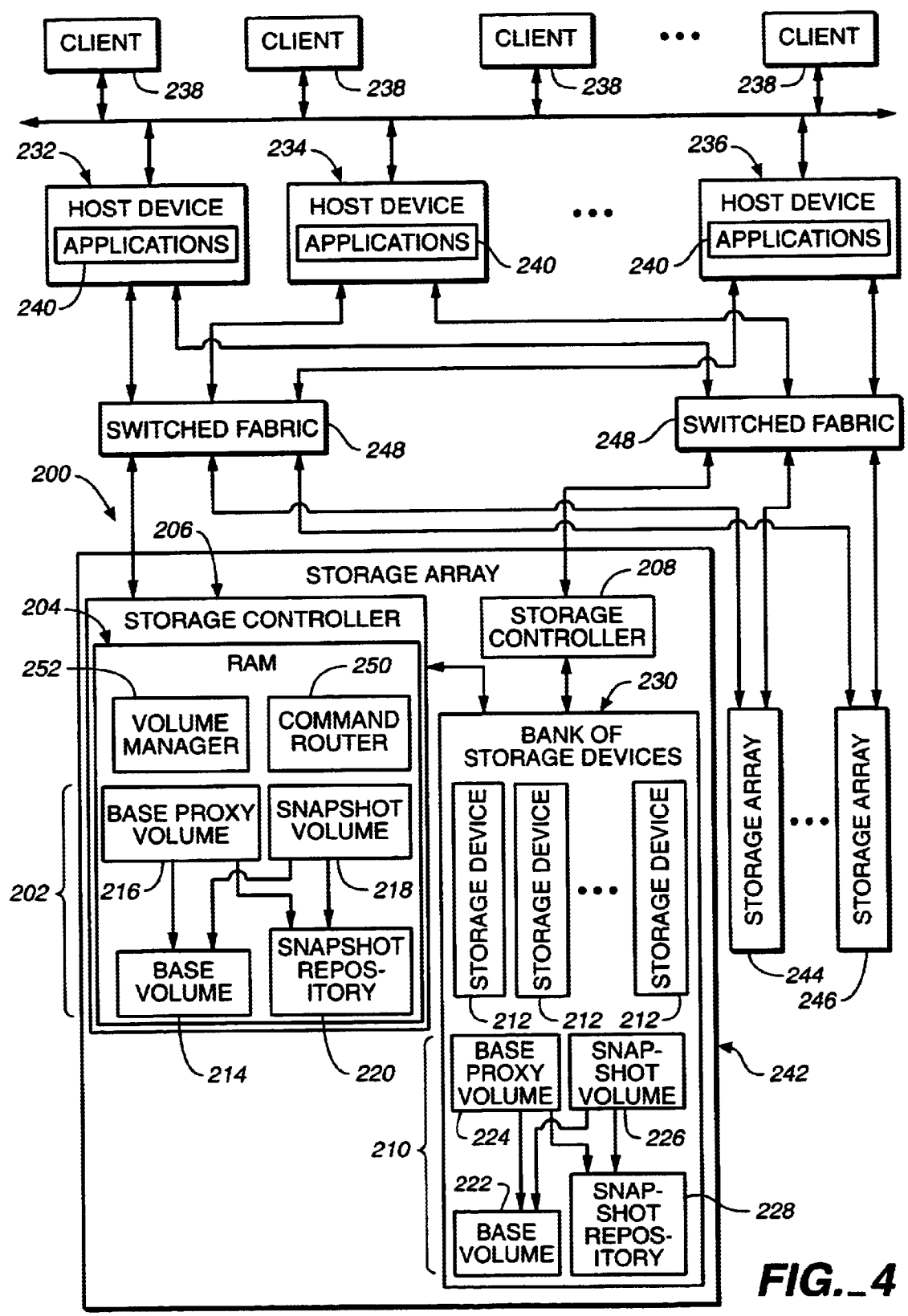
FIG._4

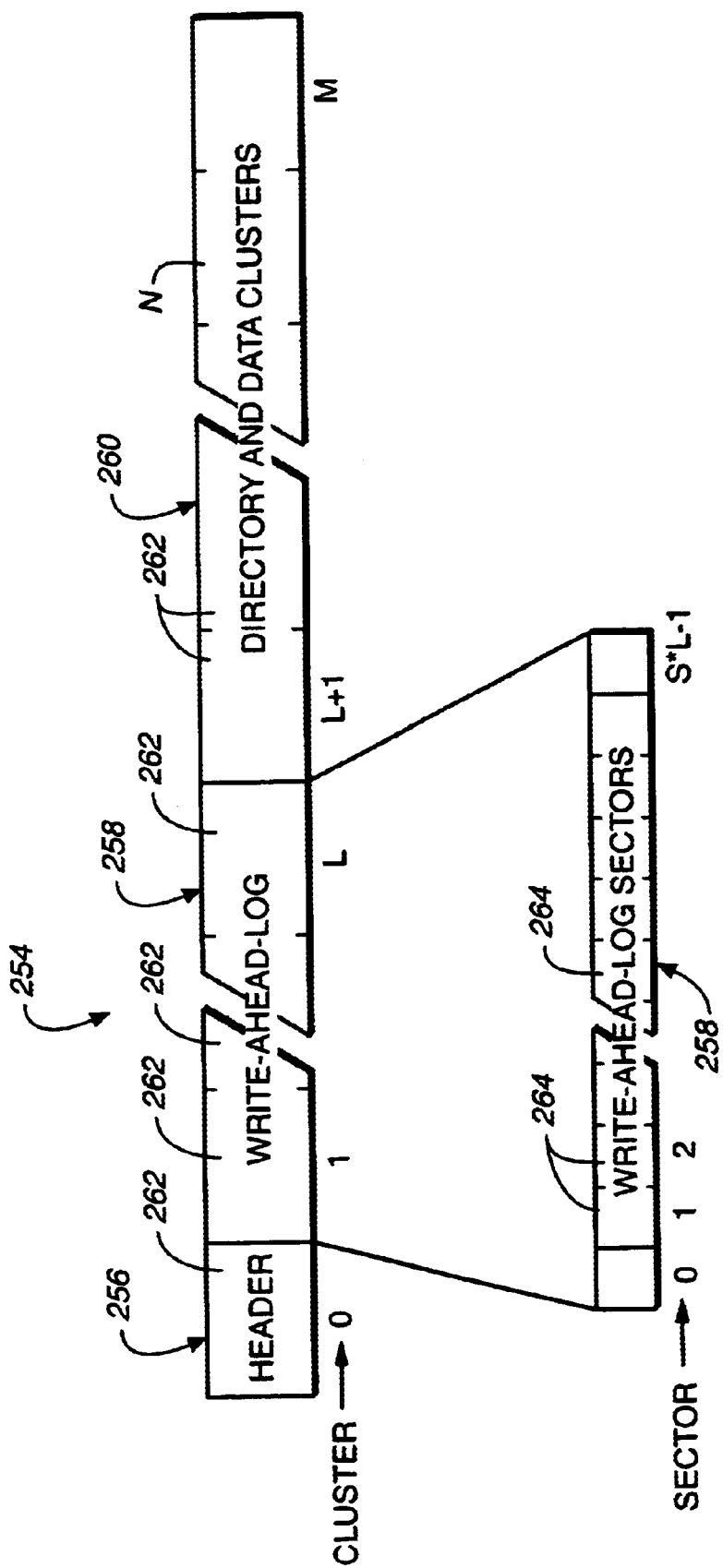
FIG._5

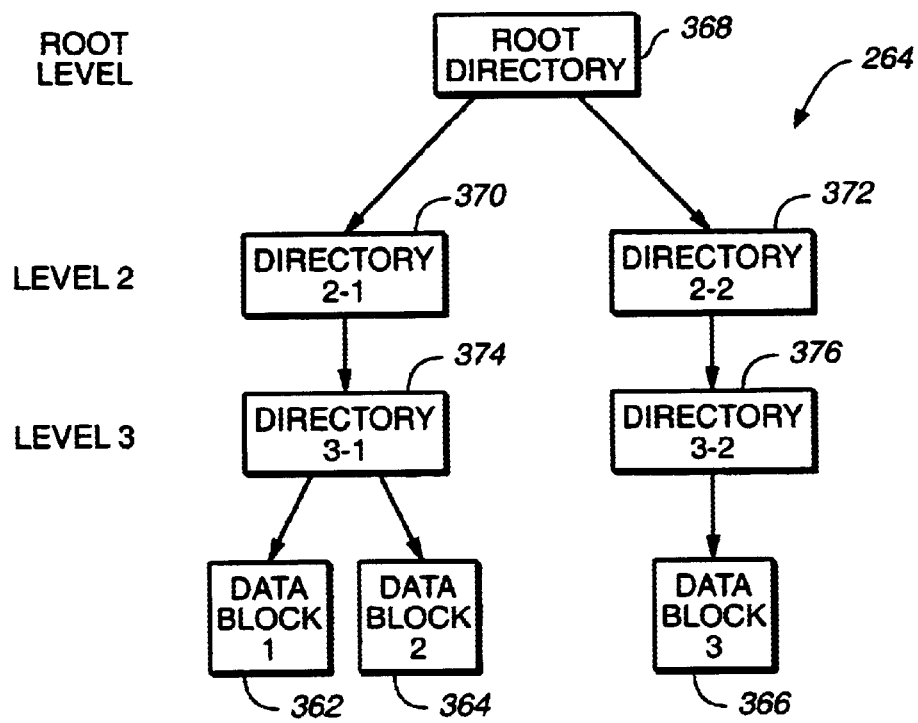
FIG._6
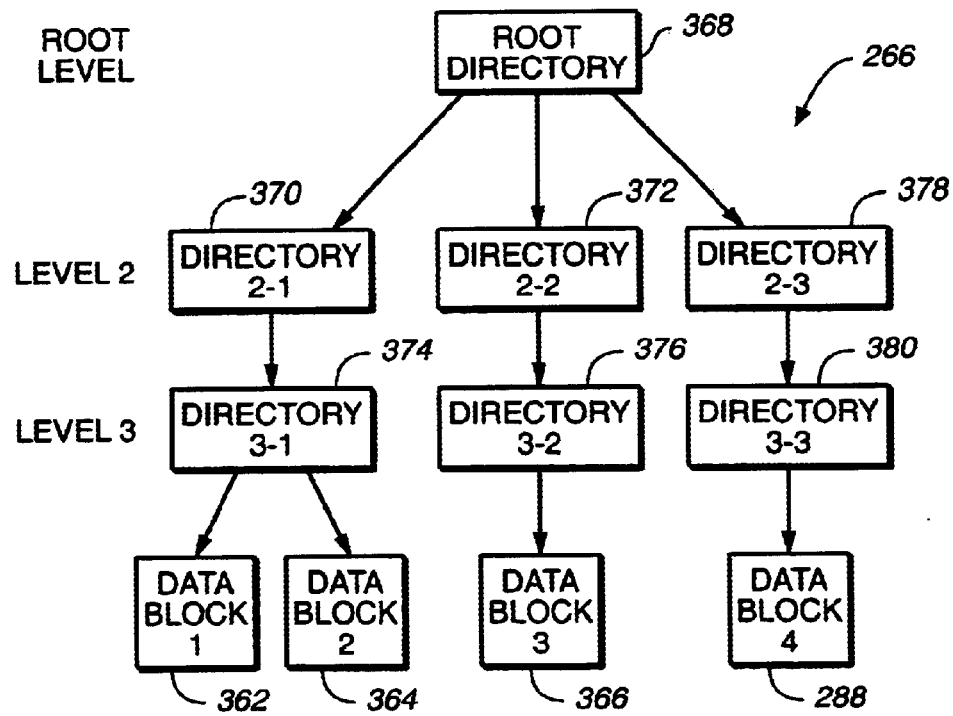
FIG._7

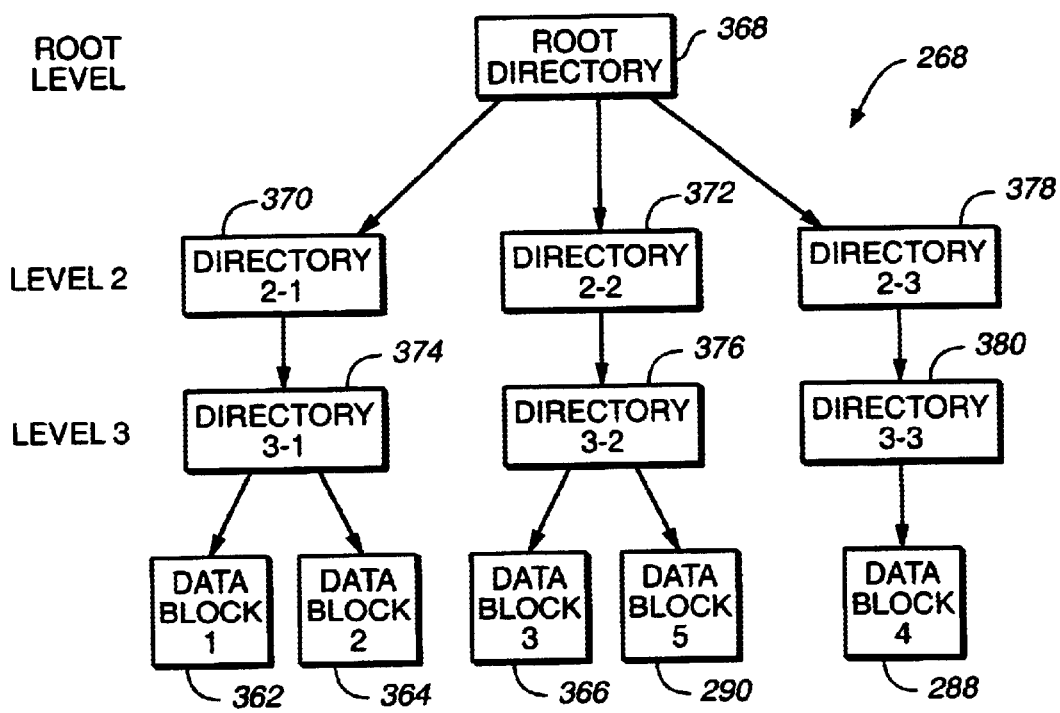
FIG._8
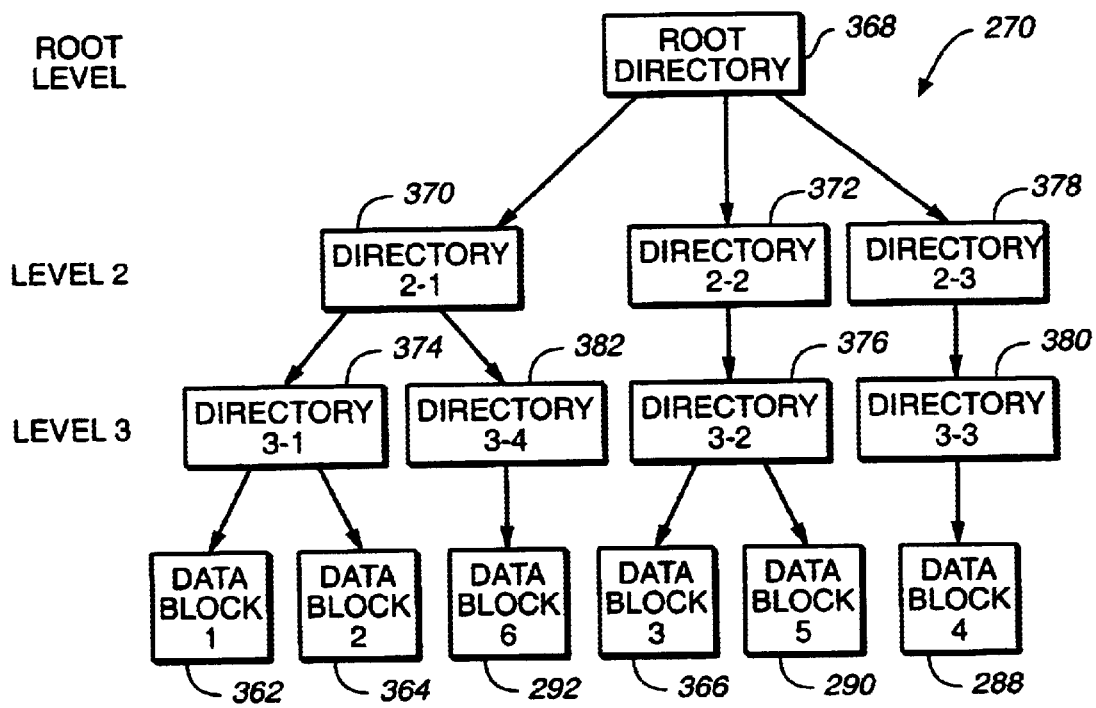
FIG._9

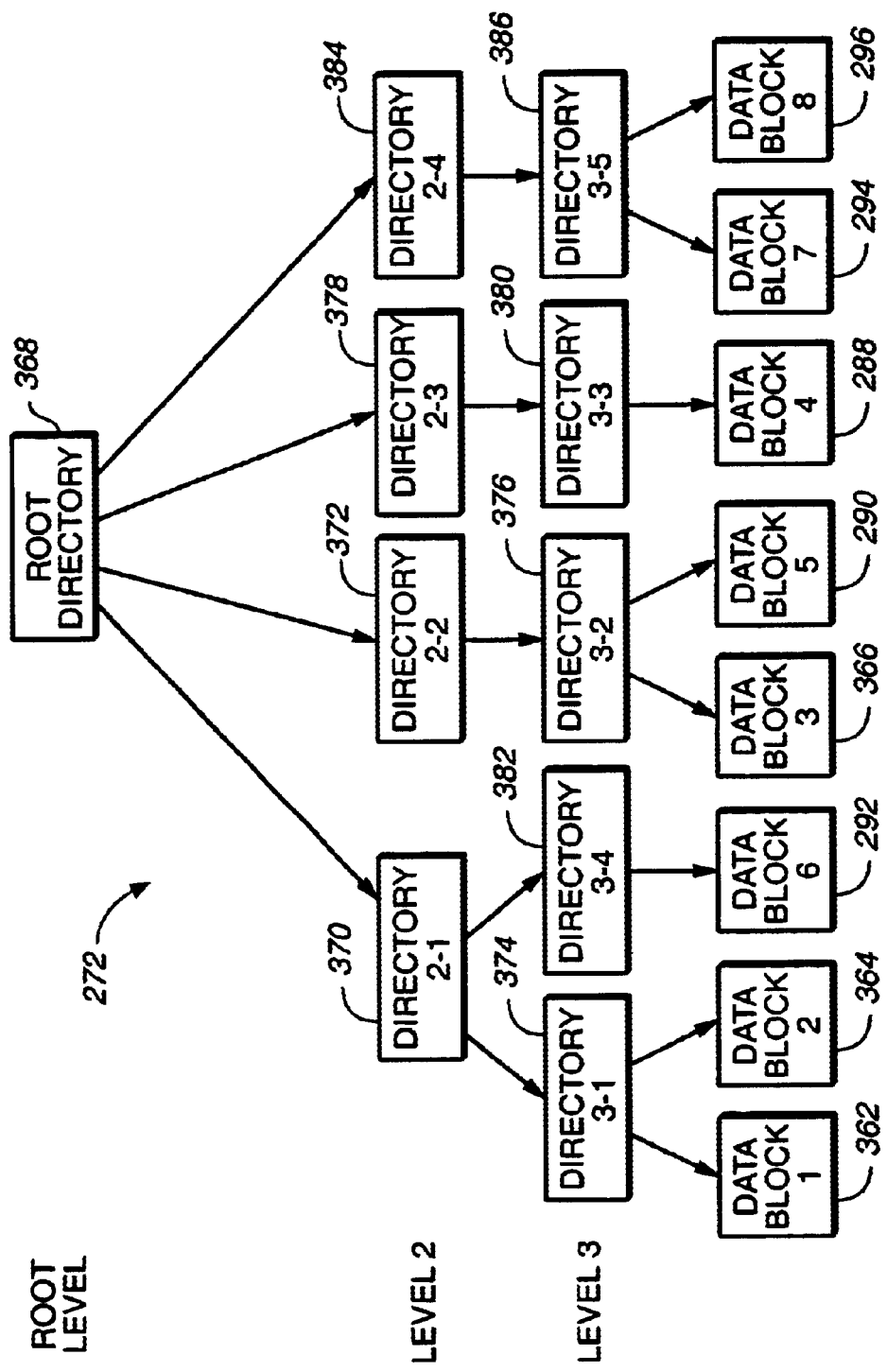
FIG._10

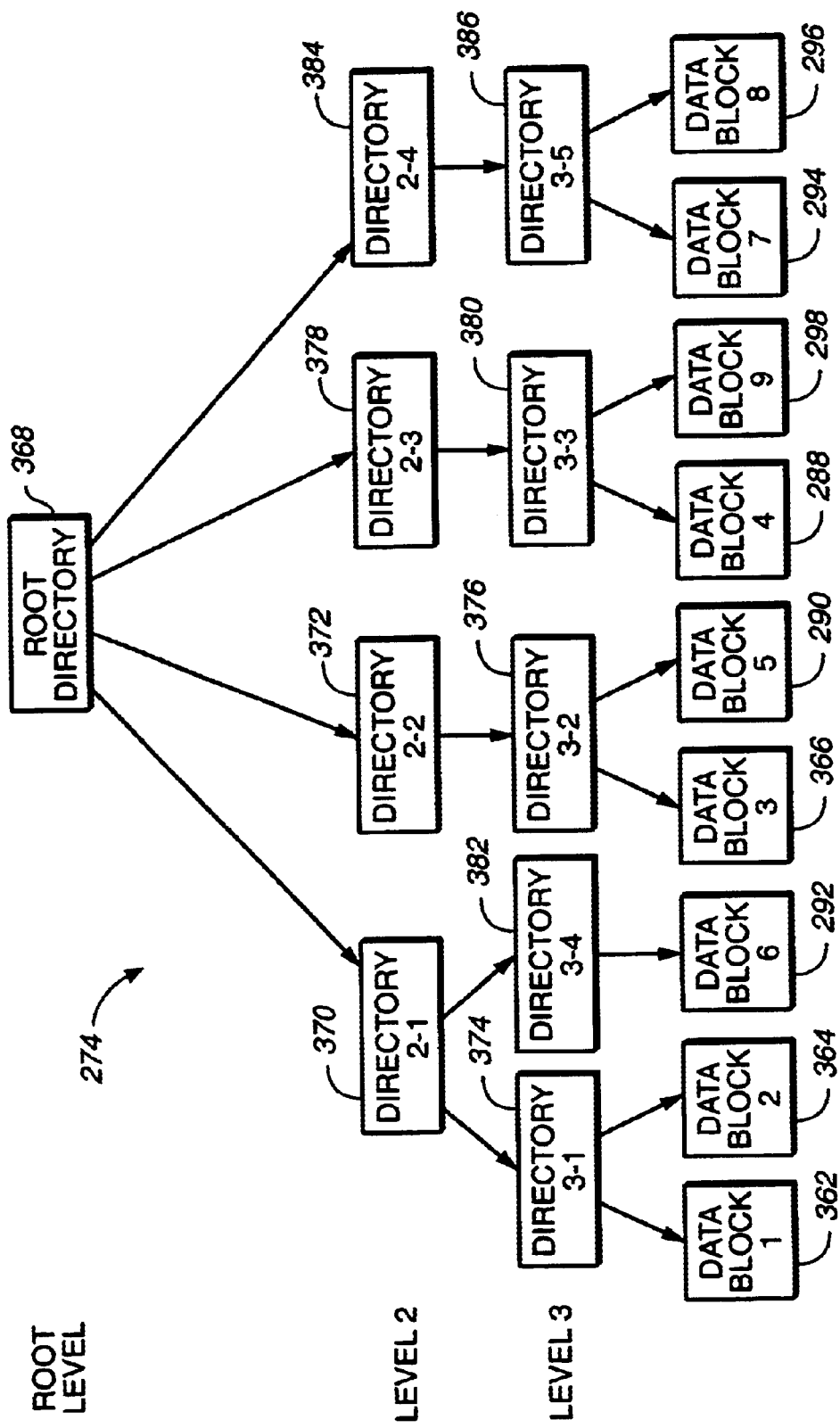
FIG._11

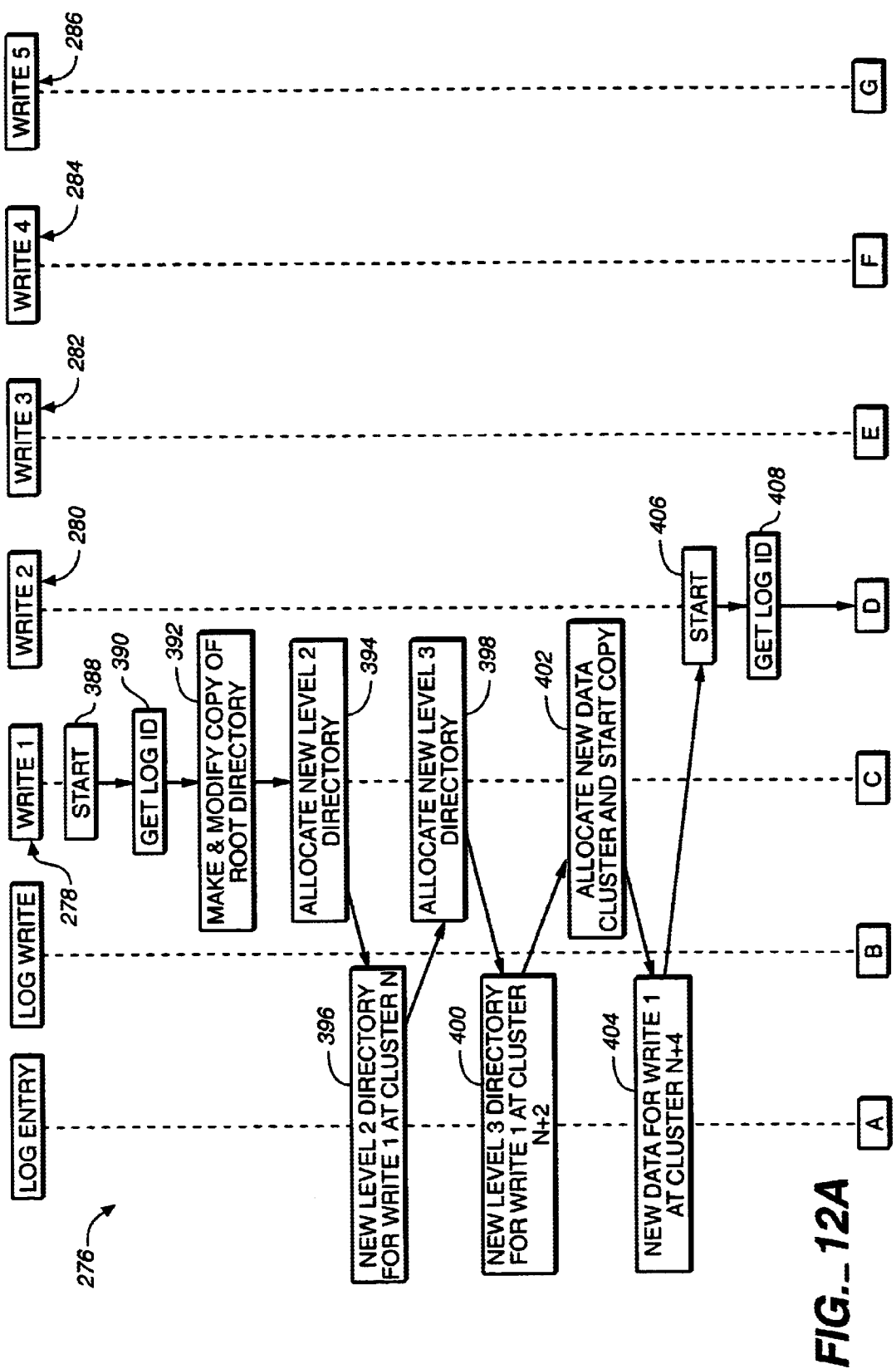
FIG._12A

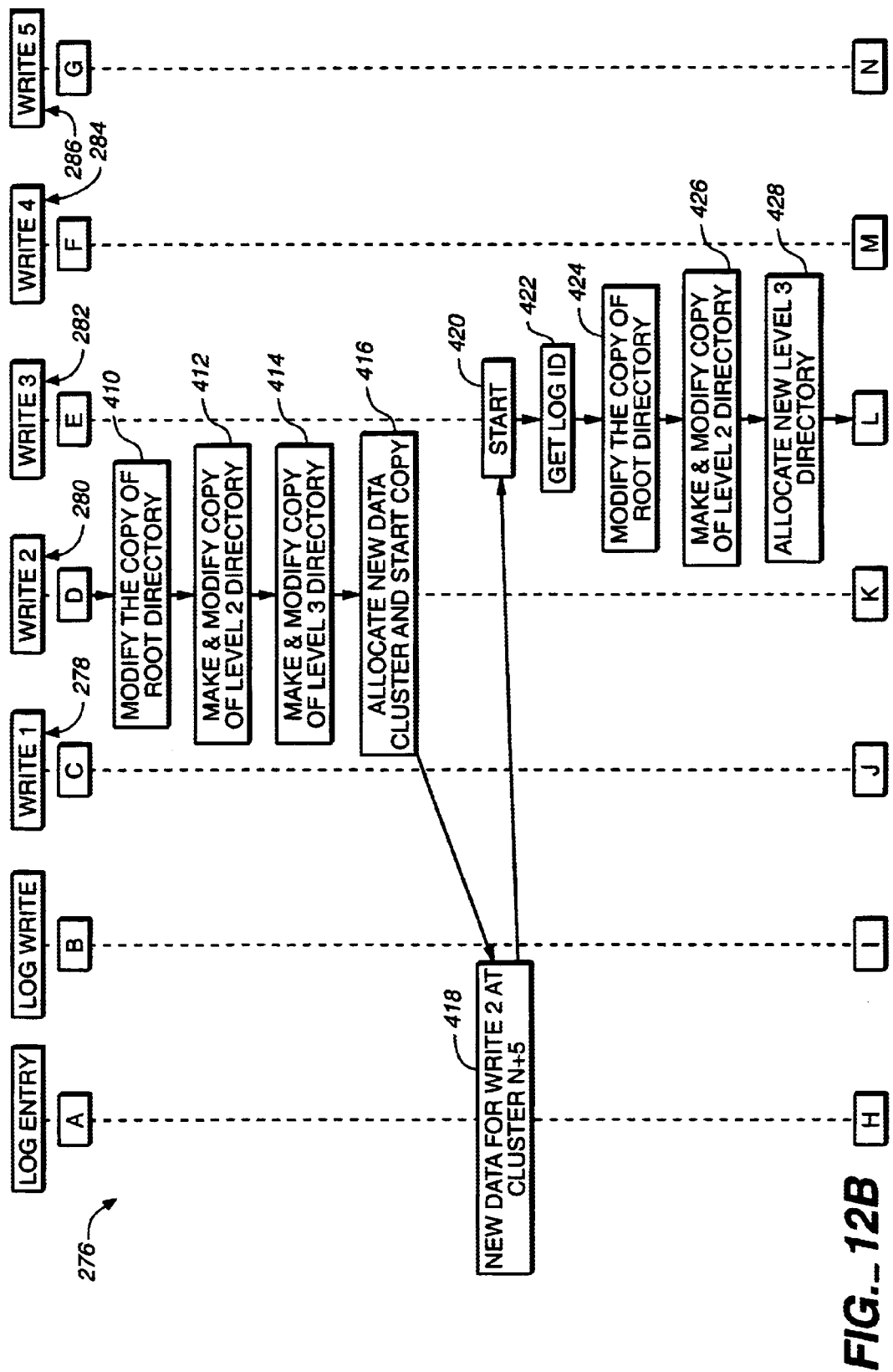
FIG._12B

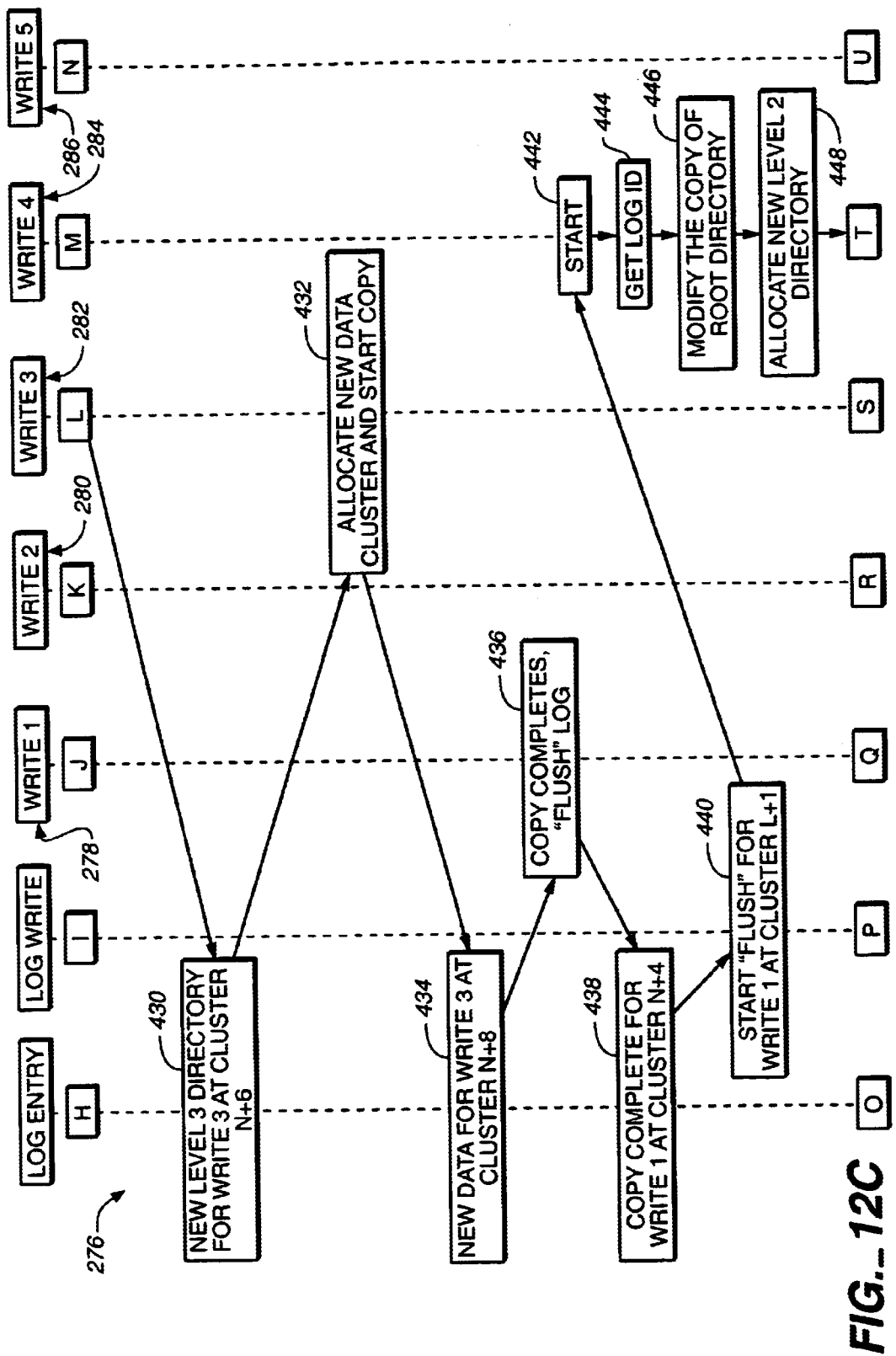
FIG._12C

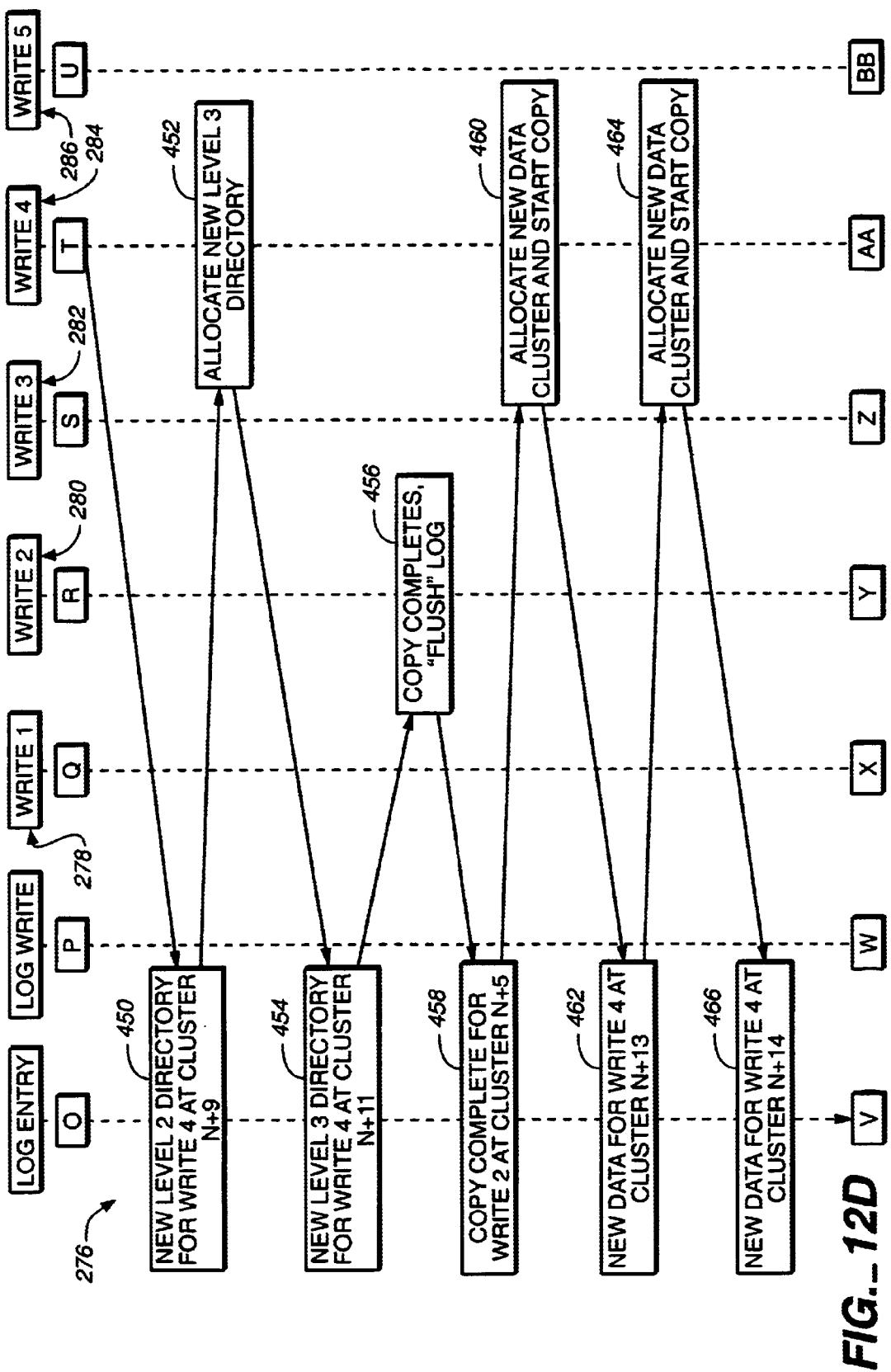
FIG._12D

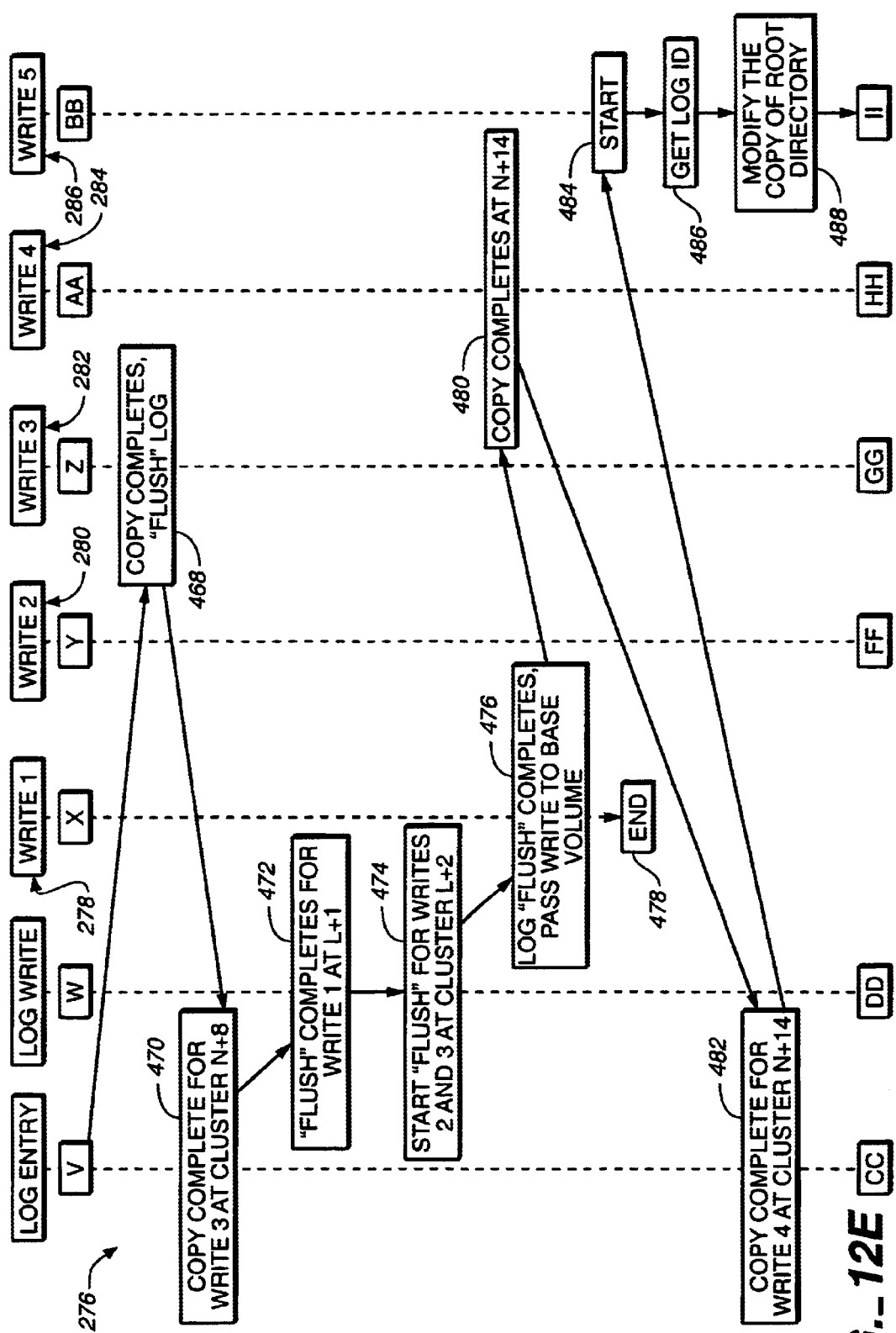
FIG._12E

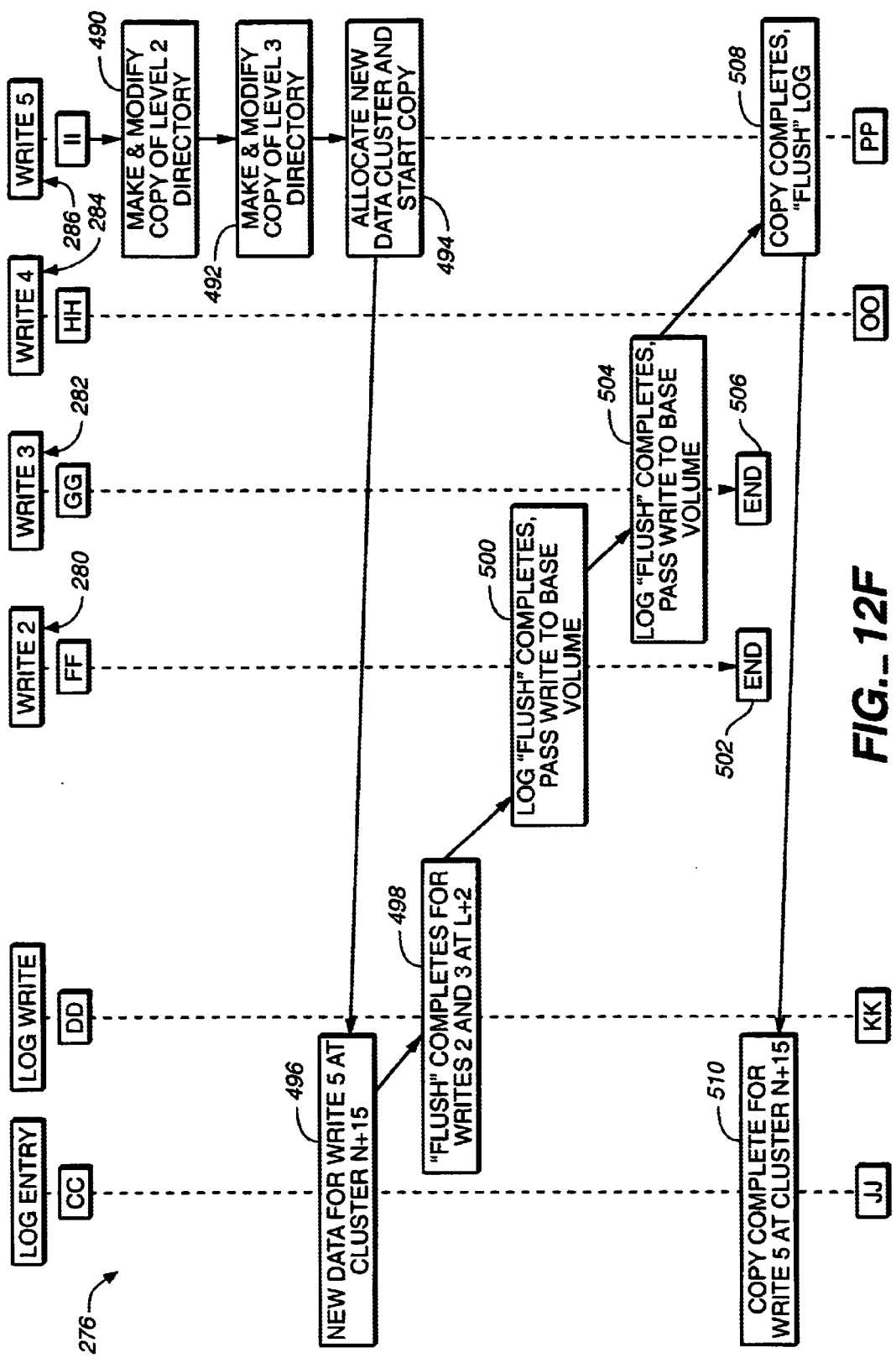
FIG._12F

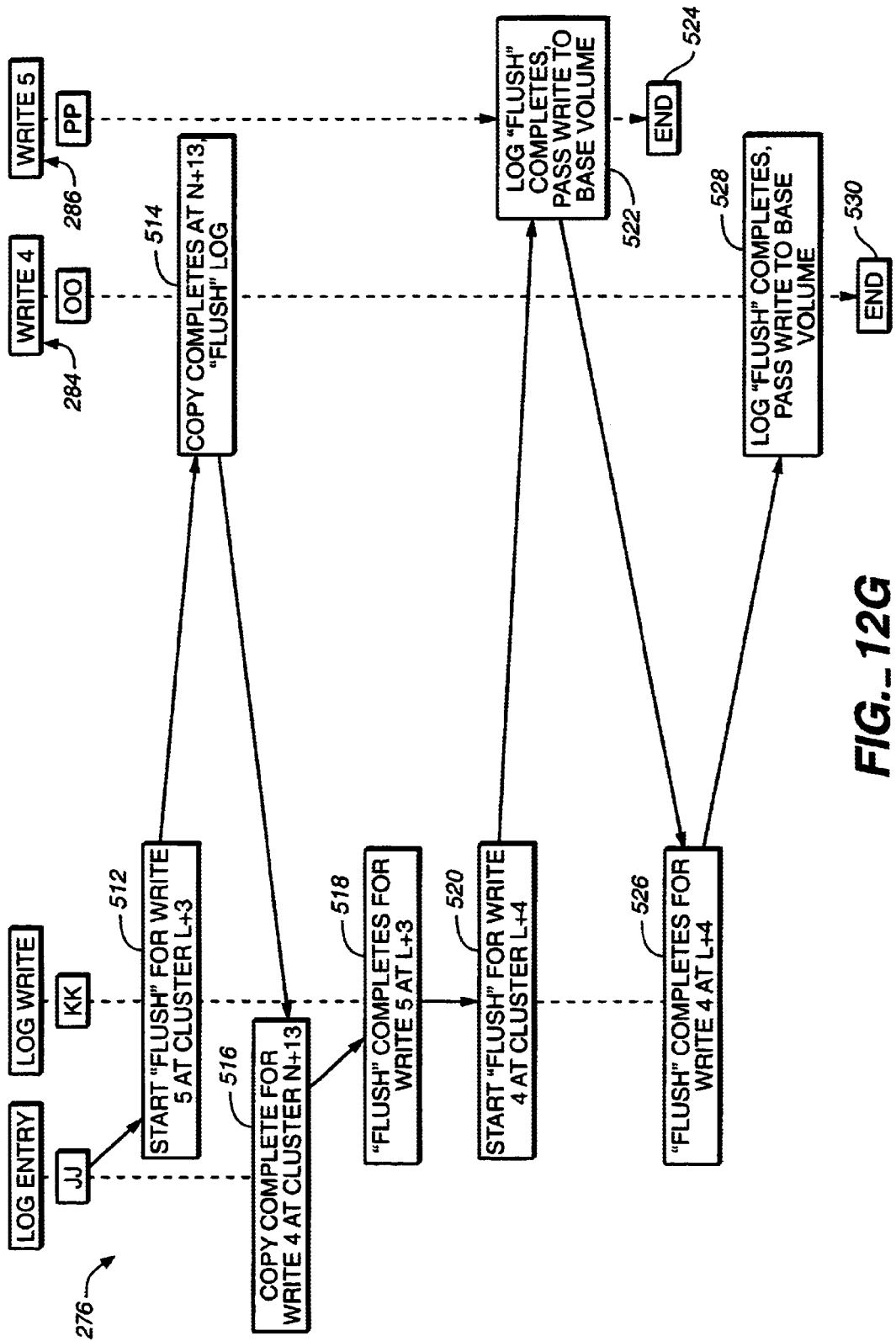
FIG. _12G

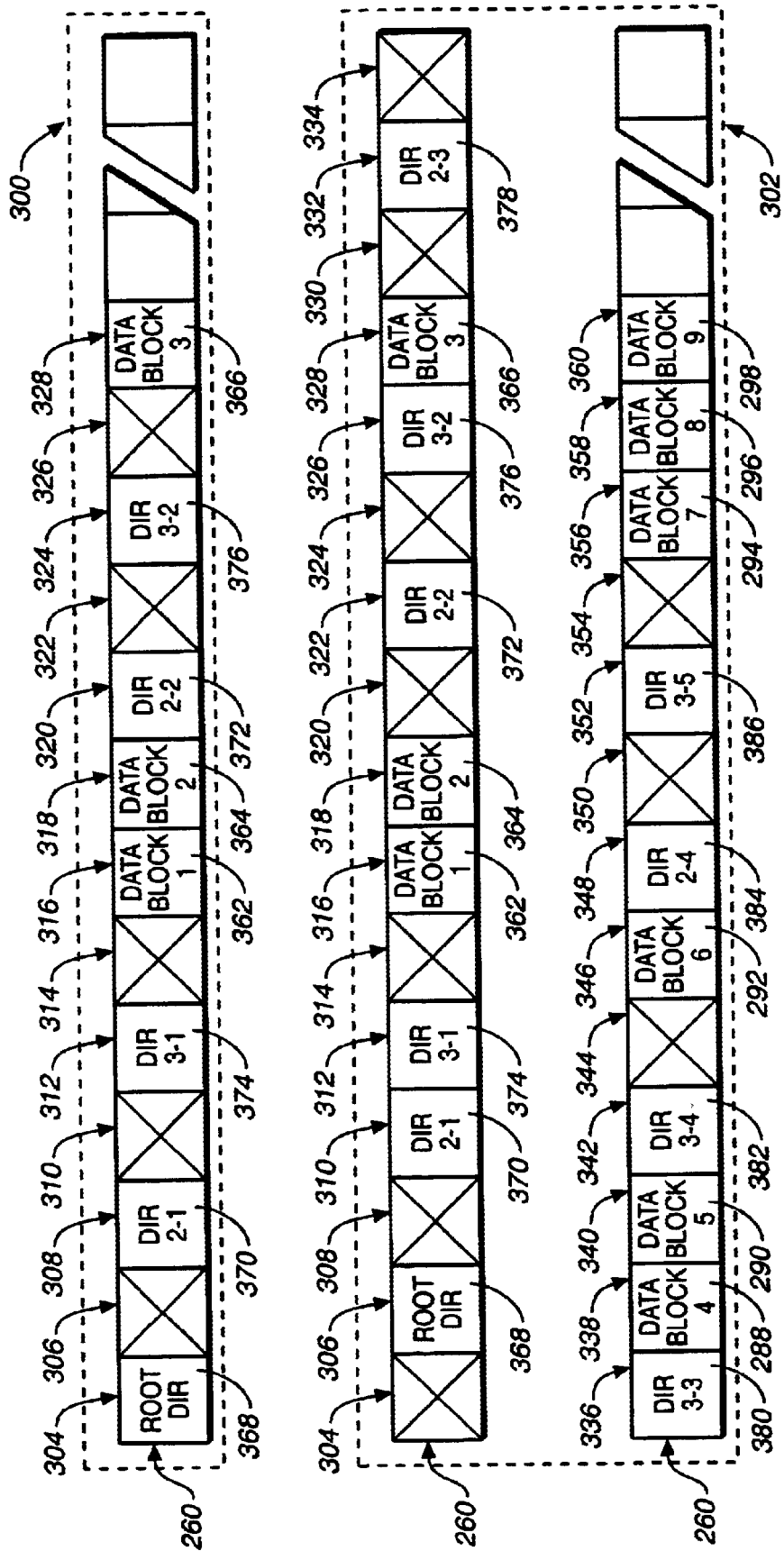
FIG._13

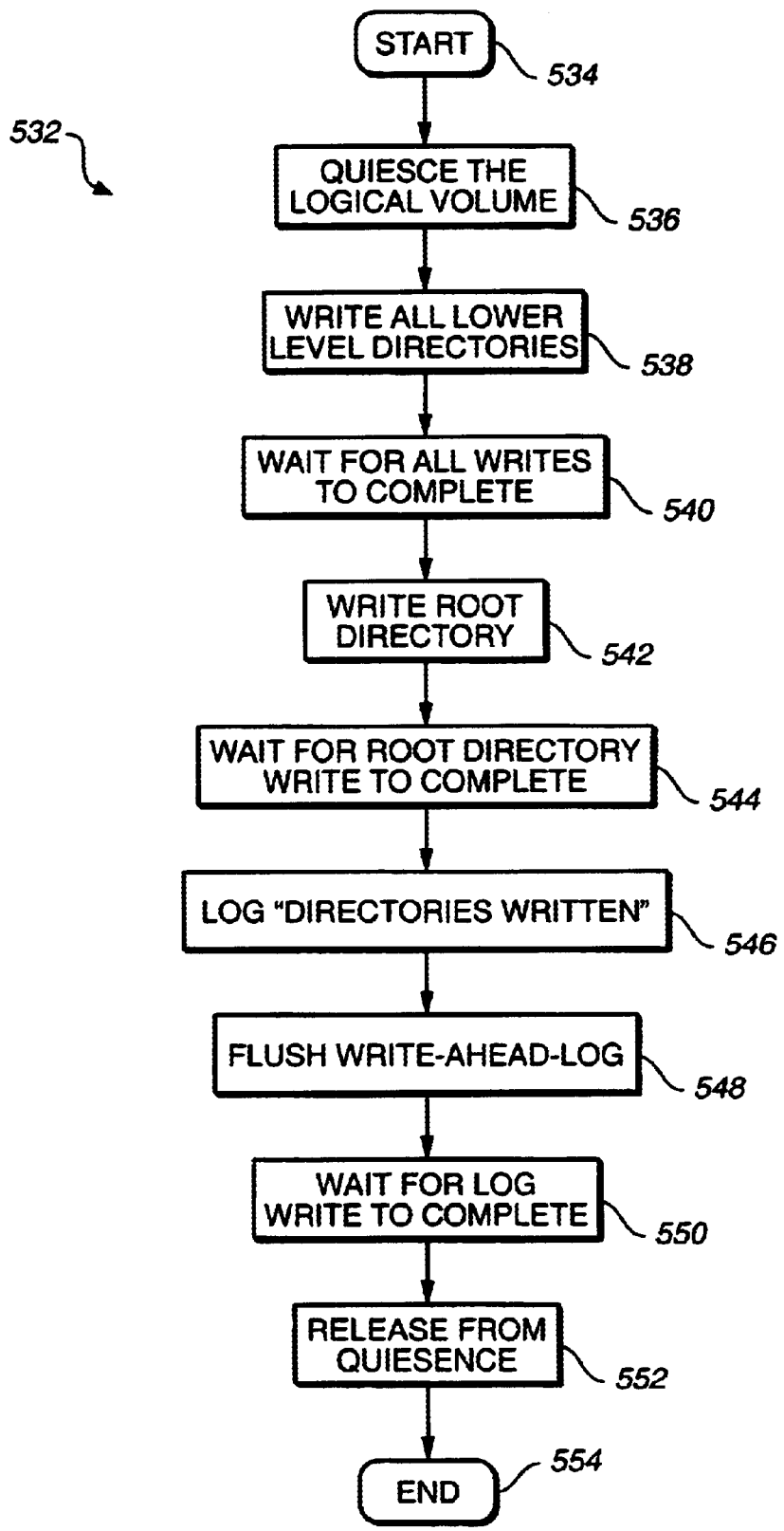
FIG._14

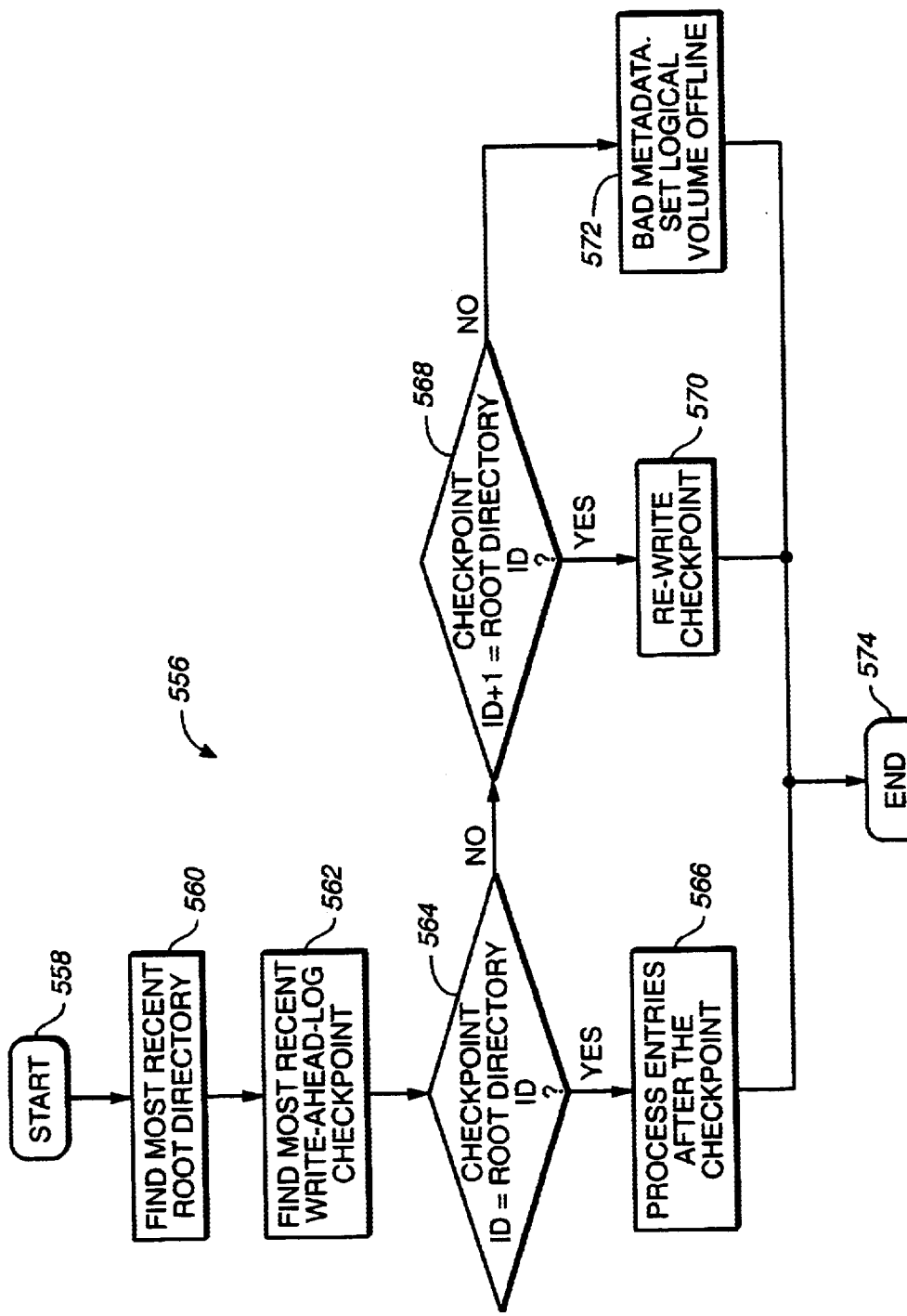
FIG._15

WRITE-AHEAD LOG IN DIRECTORY MANAGEMENT FOR CONCURRENT I/O ACCESS FOR BLOCK STORAGE

CROSS-REFERENCE TO RELATED APPLICATIONS

This invention is related to an invention for Managing a Snapshot Volume or One or More Checkpoint Volumes with Multiple Point-In-Time Images in a Single Repository, described in U.S. patent application Ser. No. 09/735,175, now U.S. Pat. No. 6,594,744 filed Dec. 11, 2000, and to an invention for Alternating Shadow Directories in Pairs of Storage Spaces for Data Storage, described in U.S. patent application Ser. No. 09/755,458, now U.S. Pat. No. 6,629,203 filed Jan. 5, 2001, and assigned to the same assignee. The disclosure of these patent applications are incorporated herein by this reference.

FIELD OF THE INVENTION

This invention relates to data storage in a computerized storage unit. More particularly, the present invention relates to improved management of directory structures for block-level computer storage using a write-ahead-log for I/O (input/output) access concurrency.

BACKGROUND OF THE INVENTION

"Backup" and "snapshot" data storage in a computer system or computer network typically involve "block-level" copying and storage of data from an original volume of data to a backup or snapshot volume. The original volume is used for active data storage for software that is operating in the computer. The blocks of data in the backup and snapshot volumes, on the other hand, are typically preserved for a time and can be restored to the original volume if the original volume ever becomes corrupted or invalid. The block-level data storage typically involves "physical" blocks of data allocated in the computer's main memory and mass storage device(s) (e.g. hard drives, tape drives, compact disk drives, etc.) and is not necessarily concerned with how the data is "logically" distributed within the data volumes.

Database management, on the other hand, typically involves "record-level" storage of data. The record-level data storage manages each "record" of data, which is a logical arrangement of the data within the data volume, which may be unrelated to the physical distribution of the data blocks within the storage devices. The record-level data storage, therefore, is typically logically "abstracted" from the physical storage thereof, so access to the records (e.g. data reads and writes) must pass through a conversion from a logical description of the desired data in the records to a physical description of the actual data in the storage devices. Thus, block-level and record-level storage techniques have very different applications, uses and purposes.

Database management, unlike block-level storage systems, commonly employs well-known write-ahead logging techniques to enhance the efficiency of updating the records in the database. When performing a write access to a record in the logical volume, information is written to the logical volume in the computer's main memory and then to the computer's storage device(s). Afterward, the application that requested the write is informed that the write has completed. With a write-ahead log, however, the information is not written immediately to the logical volume in the storage devices. Instead, the write request is "logged" into the write-ahead log, which is then stored in the storage devices, in a manner that is typically much faster than performing the entire write to the record in the logical volume. Thus, the write-ahead log keeps track of the changes that have been committed to the database, without completing the changes. After several write requests have been logged, they are processed (i.e. the write-ahead log is "flushed") in a single "batch" that quickly saves all of the information to the desired records in the logical volumes in the storage devices. The overall time for logging the write requests and subsequently flushing the write-ahead log is shorter than the time it would take if each write request were completed to the storage devices as they occurred.

A procedure for managing block-level storage for backup or snapshot applications is illustrated in FIGS. 1, 2 and 3. In this example, the volume 100 includes a directory hierarchy having three levels (root and level 2 and 3) of directories that keep track of the data blocks. An initial state of the volume 100 is shown in FIG. 1, in which the volume 100 includes a root directory 102, three level 2 directories 104, 106 and 108, three level 3 directories 110, 112 and 114 and five data blocks 116, 118, 120, 122 and 124. A final state of the volume 100 is shown in FIG. 2 after two new data blocks 126 and 128 are written ("write 1" and "write 2," respectively) to the volume 100, along with a new level 3 directory 130, according to a procedure 132 shown in FIG. 3.

In this example, the write 1 is started (at step 134) in the procedure 132 some time before the write 2, but completes after the write 2 is started (at step 136). For write 1, copies of the root and level 2 and 3 directories 102, 106 and 112 are made and modified (steps 138, 140 and 142, respectively) according to a shadow directory technique described in the second aforementioned patent application.

For write 2, since the root directory 102 has already been copied, the copy of the root directory 102 only has to be modified (step 144). A copy of the level 2 directory 108 has to be made and modified (step 146) according to the shadow directory technique described in the second aforementioned patent application. A new directory cluster has to be allocated (step 148), so the new level 3 directory 130 can be made (step 150) therein.

For write 1, a new data cluster (physical block of memory space) is allocated (step 152) for the new data block 126. The data is copied (step 154) to the new data cluster from a base volume (not shown), according to a copy-on-write procedure described in the first aforementioned patent application, and the copying completes (step 156). Likewise, for write 2, another new data cluster is allocated (step 158) for the new data block 128, the data is copied (step 160) to the new data cluster from the base volume and the copying completes (step 162).

Since both writes 1 and 2 must update a portion of the directories 102, 106, 108, 112 and 130 for the volume 100, the write 1 experiences some "dead" time 164, during which the write 1 must wait for the write 2 to finish copying (step 162) the data to the new data cluster. The level 2 and 3 directories 106, 108, 112 and 130 are written (step 166) to the storage devices for both writes 1 and 2 at the same time. The procedure 132 waits (step 168) for the level 2 and 3 directories 106, 108, 112 and 130 and the data clusters for the data blocks 126 and 128 to be written to the storage devices. The root directory 102 is written (step 170) to the storage devices, which effectively "activates" all of the copied and new directories 102, 106, 108, 112 and 130 according to the shadow directory technique described in the second aforementioned patent application. The procedure 132 waits (step 172) for the root directory 102 to be written and then passes (step 174) both writes 1 and 2 at the same time to the base volume, according to the first aforementioned patent application. In this manner, the write 1 is delayed for the dead time 164 while the write 2 "catches up" and then the writes 1 and 2 complete together.

It is with respect to these and other background considerations that the present invention has evolved.

SUMMARY OF THE INVENTION

An improvement of the present invention is that write requests directed to the same volume do not have to wait for each other to complete. Thus, enhanced concurrency of write requests is achieved. Write-ahead logging features are incorporated into block-level storage, so that directory updates for each write request can be logged and the write request can be allowed to complete independently of other write requests. Therefore, the present invention involves greater efficiency for block-level storage for backup and snapshot applications in computerized storage systems.

These and other improvements are achieved by managing block-level storage in a computerized storage system by recording into a write-ahead log a description of block-level updates made to the data in the volume in a main memory and in a storage device of the computerized storage system preferably in response to write requests received from a request source, such as a storage host device. The block-level updates are made to data clusters in the volume in the main memory and in the storage device. Updates are also made to directory clusters in the main memory. The updates to the directory clusters in the storage device are preferably not made until after a plurality of the updates have been made to the directory clusters in the main memory. Then the updated directory clusters are copied from the main memory to the storage device all at once. In the meantime, before the updated directory clusters are copied to the storage device, the entries in the write-ahead log are copied to the storage device, so that the updated directory clusters can be reconstructed from the write-ahead log and the non-updated directory clusters in the storage device if the volume in the main memory is ever lost or corrupted. Upon copying the descriptions of the block-level updates in the write-ahead log from the main memory to the storage device, the write requests are preferably deemed to have completed, even though the updated directory clusters have not yet been written to the storage device. Therefore, the write requests can complete without having to quiesce the volume with each write request to write the directory clusters to the storage device.

A more complete appreciation of the present invention and its scope, and the manner in which it achieves the above noted improvements, can be obtained by reference to the following detailed description of presently preferred embodiments of the invention taken in connection with the accompanying drawings, which are briefly summarized below, and the appended claims.

BRIEF DESCRIPTION OF THE DRAWINGS

FIG. 1 is a block diagram of a prior art logical volume showing its directory hierarchy.

FIG. 2 is a block diagram of the prior art logical volume shown in FIG. 1 showing a second directory hierarchy.

FIG. 3 is a flowchart of a prior art procedure for writing data blocks to the prior art logical volume shown in FIGS. 1 and 2 to change from the directory hierarchy shown in FIG. 1 to the directory hierarchy shown in FIG. 2.

FIG. 4 is a block diagram of a computerized storage system incorporating the present invention.

FIG. 5 is a data structure of a logical volume incorporating a write-ahead log for use in the computerized storage system shown in FIG. 4.

FIGS. 6–11 are block diagrams of the logical volume shown in FIG. 5 showing different states of its directory hierarchy.

FIGS. 12A–12G are a flowchart of a procedure for writing data blocks to the logical volume shown in FIG. 5 to achieve the states of the directory hierarchy shown in FIGS. 6–11.

FIG. 13 is a block diagram of initial and final states of a data structure for directory and data clusters incorporated in the computerized storage system shown in FIG. 4.

FIG. 14 is a flowchart of a procedure to "flush" the write-ahead log of the logical volume shown in FIG. 5.

FIG. 15 is a flowchart of a procedure to recover the logical volume shown in FIG. 5 using the write-ahead log after a failure or error in the computerized storage system shown in FIG. 4.

DETAILED DESCRIPTION

A computerized data storage system 200, as shown in FIG. 4, such as a storage area network (SAN), stores and retrieves data in logical volumes 202 that are contained in a main memory RAM 204 of more than one conventional multi-host channel RAID (Redundant Array of Independent Drives) storage controller (a.k.a. array controller) 206 and 208. Copies of the logical volumes 202 (copied logical volumes 210) are maintained in one or more conventional storage devices 212 (e.g. hard drives, tape drives, compact disk drives, etc.). The aforementioned patent applications describe such a computerized data storage system 200 and the management and use of the logical volumes 202 therein.

Generally, the logical volumes 202 include a base volume 214, a base proxy volume 216, a snapshot volume 218 and a snapshot repository 220. The base volume 214 is typically the primary volume for storing the data in the computerized data storage system 200. Thus, the data stored in the base volume 214 is frequently added, deleted and modified as needed. The base proxy volume 216, the snapshot volume 218 and the snapshot repository 220 are used when "snapshots" or "checkpoints" are formed from the base volume 214, as described in the aforementioned patent applications. Likewise, the copied logical volumes 210 include a copied base volume 222, a copied base proxy volume 224, a copied snapshot volume 226 and a copied snapshot repository 228 corresponding to the base volume 214, the base proxy volume 216, the snapshot volume 218 and the snapshot repository 220, respectively. A write-ahead log (described below) is used in the logical volumes 202 and the copied logical volumes 210, particularly in the snapshot repository 220 and the copied snapshot repository 228, to manage the internal hierarchy of directories (described below) of the logical volumes 202 and copied logical volumes 210.

The snapshot repository 220 generally includes copies of the data in the base volume 214. The data copied from the base volume 214 to the snapshot repository 220 is typically written once into the snapshot repository 220 and seldom, if ever, changed until the snapshot repository 220 is no longer needed and can be deleted as a whole. A shadow directory technique, described in the second aforementioned patent application, is preferably used to manage the data and directories contained in the snapshot repository 220 in the data storage system 200.

Generally, the data storage system 200 also includes conventional banks 230 of the storage devices 212 that are accessed by one or more conventional host devices 232, 234 and 236 typically on behalf of one or more conventional client devices 238 or applications 240 running on the host devices 232–236. The storage devices 212 in the storage banks 230 are preferably incorporated in conventional high-volume, high-bandwidth storage arrays 242, 244 and 246. Storage space in the storage devices 212 within the storage arrays 242–246 is configured into the copied logical volumes 210. The host devices 232–236 utilize the logical volumes 202 (and/or 210) to store data for the applications 240 or the client devices 238. The host devices 232–236 issue data access requests, on behalf of the client devices 238 or applications 240, to the storage arrays 242–246 for access to the logical volumes 202 (and/or 210).

The storage arrays 242–246 typically have more than one of the array controller 206 and 208, as shown in storage array 242. The array controllers 206 and 208 work in concert to manage the storage array 242, to create the logical volumes 202 and the copied logical volumes 210, to handle the data access requests to the logical volumes 202 (and/or 210) that are received by the storage array 242 and to manage the write-ahead logs (described below). The array controllers 206 and 208 connect to the storage devices 212 to send and receive data to and from the copied logical volumes 210. The array controllers 206 and 208 send and receive data, data access requests, message packets and other communication information to and from the host devices 232–236 through conventional interface ports (not shown) connected to conventional switched fabrics 248. The host devices 232–236 send and receive the communication information through conventional host bus adapters (not shown) connected to the switched fabrics 248. The array controllers 206 and 208 also include the RAM 204 on which the logical volumes 202 and other software reside while operating or being operated upon.

The logical volumes 202 are shown in the storage controllers 206 and 208, since it is within the storage controllers 206 and 208, while resident in the RAM 204, that the logical volumes 202 perform their functions and are managed. The storage devices 212 provide mass storage space for the copied logical volumes 210.

The base volume 214 typically stores the data that is currently being utilized by the client devices 238 or applications 240. If no snapshot volume 218 has yet been created for the base volume 214, then the base volume 214 is the only logical volume 202 present in the. RAM 204 or in the storage devices 212. The snapshot volume 218 is typically created when it is desired to preserve the state of the base volume 214 at a particular point in time. Other snapshot volumes (not shown) may subsequently be created when it is desired to preserve the state of the base volume 214 or of the snapshot volume 218 at another point in time.

When the snapshot volume 218 is created, the base proxy volume 216 and the snapshot repository 220 corresponding to the snapshot volume 218 are also created. The snapshot repository 220 contains copies of data clusters, or storage blocks, (not shown) from the corresponding base volume 214. The snapshot repository 220 also contains directory clusters (not shown) with which the data clusters are located. The snapshot repository 220 also contains a write-ahead log containing entries that describe changes, updates or additions to the directory clusters that have not yet been written to the copied snapshot repository 228 in the storage devices 212. The snapshot repository 220 also contains software code for performing certain functions, such as searching for data clusters within the snapshot repository 220 and saving data clusters to the snapshot repository 220.

The snapshot volume 218 preferably represents the state of the data in the corresponding base volume 214 at the point in time when the snapshot volume 218 was created. A data access request that is directed to the snapshot volume 218 will be satisfied by data either in the snapshot repository 220 or in the base volume 214. Thus, the snapshot volume 218 does not contain any of the data. Rather, the snapshot volume 218 includes identifiers for the corresponding base volume 214 and the snapshot repository 220. The snapshot volume 218 also includes software code for performing certain functions, such as data read and write functions, on the corresponding base volume 214 and snapshot repository 220. Additionally, it is possible to reconstruct, or rollback, the corresponding base volume 214 to the state at the point in time when the snapshot volume 218 was created by copying the data clusters in the corresponding snapshot repository 220 back to the base volume 214 by issuing a data read request to the snapshot volume 218.

The base proxy volume 216 preferably intercepts the data access requests directed to the base volume 214 transparent to the host devices 232–236. The base proxy volume 216 includes software code for performing certain functions, such as data read and write functions and copy-on-write functions, on the corresponding base volume 214 and snapshot repository 220. Thus, the base proxy volume 216 does not contain any of the data, but includes identifiers for the corresponding base volume 214 and snapshot repository 220.

A command router 250 (a software program resident in the RAM 204) executes on each of the storage controllers 206 and 208 to receive and process data access commands directed to the base volume 214 and the snapshot volume 218. Thus, the command router 250 includes identifiers for the base proxy volume 216 (or the base volume 214 if there are no base proxy volumes 216 or the topmost base proxy volume 216 if there are multiple base proxy volumes 216 in a hierarchy of base proxy volumes 216) and the snapshot volumes 218.

Additionally, a volume manager 252 (a software program resident in the RAM 204) executes on each of the storage controllers 206 and 208 to manage the creation, deletion and modification of the snapshot volumes 218, the base proxy volumes 216 and the snapshot repositories 220. The volume manager 252 also configures the command router 250 with the identifiers for the topmost base proxy volume 216 and the snapshot volumes 218 and configures the base proxy volumes 216 and the snapshot volumes 218 with the identifiers for the corresponding base volumes 214 and snapshot repositories 220.

An exemplary data structure 254 for the snapshot repository 220 (FIG. 4) and copied snapshot repository 228 (FIG. 4) is shown in FIG. 5. The data structure 254 may also be used for any of the other logical volumes 202 (FIG. 4) if appropriate. The data structure 254 includes a header section 256 a write-ahead log section 258 and a directory and data section 260. The data structure 254 includes M+1 clusters, or blocks 262. The header section 256 includes one cluster 262. The write-ahead log section 258 in includes L clusters 262. The directory and data section 260 includes M–L clusters 262. The cluster 262 labeled N in the directory and data section 260 is the current starting cluster 262 for allocating clusters 262 for directories and data to be added to the snapshot repository 220 and copied snapshot repository 228. Each cluster 262 includes S sectors 264, so the write-ahead log section 258 includes S*L sectors.

FIGS. 6–11 show exemplary states 264, 266, 268, 270, 272 and 274 for the directory hierarchy for an exemplary logical volume 202 (FIG. 4) as data blocks and directories are added to the logical volume 202. The directory hierarchy states 264–274 also apply to one of the copied logical volumes 210 (FIG. 4) corresponding to the logical volume 202. The directory hierarchy for each state 264–274, in this example, includes three directory levels (e.g. a root level and levels 2 and 3).

The data blocks and directories are added according to exemplary concurrent write requests, described below with reference to a procedure 276 shown in FIGS. 12A–G. In the procedure 276, five write requests 278, 280, 282, 284 and 286 concurrently add six data blocks 288 (FIG. 7), 290 (FIG. 8), 292 (FIG. 9), 294 (FIG. 10), 296 (FIG. 10) and 298 (FIG. 11) to the exemplary logical volume 202 (FIG. 4).

FIG. 13 shows an initial state 300 and a final state 302 of the directory and data section 260 (see also FIG. 5) of the data structure 254 (FIG. 5) for the exemplary logical volume 202 (FIG. 4) before and after the data blocks 288, 290, 292, 294, 296 and 298 (FIGS. 7–11) have been added to clusters 304–360 in the directory and data section 260. For the shadow directory technique described in the second aforementioned patent application, the clusters 304–360 are allocated for directory clusters in pairs (304, 306), (308, 310), (312, 314), (320, 322), (324, 326), (330, 332), (334, 336), (342, 344), (348, 350) and (352, 354). The added data blocks 288, 290, 292, 294, 296 and 298 are written to data clusters 338, 340, 346, 356, 358 and 360.

The initial state 264 of the directory hierarchy, corresponding to the initial state 300 (FIG. 13) of the directory and data section 260 (FIGS. 5 and 13), is shown in FIG. 6. In the initial state 264, three data blocks 362, 364 and 366 have been written to the logical volume 202 (FIG. 4) in data clusters 316, 318 and 328 (FIG. 13), respectively. A root directory 368 has been written to directory cluster 304 (FIG. 13). Two level 2 directories 370 and 372 have been written to directory clusters 308 and 320 (FIG. 13), respectively, which are located by conventional entries (not shown) in the root directory 368. Two level 3 directories 374 and 376 have been written to directory clusters 312 and 324 (FIG. 13), respectively, which are located by entries (not shown) in the level 2 directories 370 and 372, respectively. The data blocks 362 and 364 are located by entries (not shown) in the level 3 directory 374, and the data block 366 is located by an entry (not shown) in the level 3 directory 376.

At state 266, shown in FIG. 7, new data block 288 has been written in the write request 278 (FIGS. 12A–E) to the logical volume 202 (FIG. 4) in the data cluster 338 (FIG. 13). Additionally, for this example, new level 2 and 3 directories 378 and 380 have been added to the directory hierarchy to locate the new data block 288. The new level 2 and 3 directories 378 and 380 are initially located in data clusters 330 and 334 (FIG. 13), but, as described below with reference to the addition of data block 298 (FIG. 11), will eventually be copied to data clusters 332 and 336 (FIG. 13).

At state 268, shown in FIG. 8, new data block 290 has been written in the write request 280 (FIGS. 12A–F) to the logical volume 202 (FIG. 4) in the data cluster 340 (FIG. 13). For this example, the new data block 290 is added to the level 3 directory 376, so no new directories need to be added. For the shadow directory technique, however, the level 2 directory 372 and the level 3 directory 376 are copied from directory clusters 320 and 324, respectively, as shown in the state 300 in FIG. 13, to directory clusters 322 and 326, respectively, as shown in the state 302 in FIG. 13.

At state 270, shown in FIG. 9, new data block 292 has been written in the write request 282 (FIGS. 12A–F) to the logical volume 202 (FIG. 4) in the data cluster 346 (FIG. 13). For this example, the new data block 292 is added to the level 2 directory 370, so new level 3 directory 382 must be added to the directory hierarchy to locate the new data block 292. Thus, the new level 3 directory 382 is formed in directory cluster 342 (FIG. 13). For the shadow directory technique, the level 2 directory 370 is copied from directory cluster 308, as shown in state 300 in FIG. 13, to directory cluster 310, as shown in state 302 in FIG. 13.

At state 272, shown in FIG. 10, the two new data blocks 294 and 296 have been written in the one write request 284 (FIGS. 12A–G) to the logical volume 202 (FIG. 4) in the data clusters 356 and 358 (FIG. 13), respectively. For this example, new level 2 and 3 directories 384 and 386 have been added to the directory hierarchy in the directory clusters 348 and 352 (FIG. 13) to locate the new data blocks 294 and 296.

At state 274, shown in FIG. 11, the new data block 298 has been written in the write request 286 (FIGS. 12A–G) to the logical volume 202 (FIG. 4) in the data cluster 360 (FIG. 13). For this example, the new data block 298 is added to the level 3 directory 380, so no new directories need to be added. For the shadow directory technique, however, the level 2 directory 378 and the level 3 directory 380 are copied from directory clusters 330 and 334, respectively, as shown in the state 300 in FIG. 13, to directory clusters 332 and 336, respectively, as shown in the state 302 in FIG. 13.

The exemplary procedure 276, as shown in FIGS. 12A–G, shows the steps that occur for each write request 278, 280, 282, 284 and 286 and the steps that occur for recording entries in the write-ahead log 258 (FIG. 5) and for writing the write-ahead log 258 to the storage devices 212 (FIG. 4). In this example, each of the write requests 278–286 requires a block-level copy of a data block from the base volume 214 (FIG. 4) to the snapshot repository 220 (FIG. 4) and a corresponding change or addition to the directory hierarchy of the snapshot repository 220, as described above with reference to FIGS. 6–11. The changes and additions to the directory hierarchy cause entries to be made in the write-ahead log 258, which are subsequently written to the storage devices 212. The block-level copies of data blocks from the base volume 214 to the snapshot repository 220 occur as part of other write requests (not shown) in which new data blocks are to be written to the base volume 214. Before the new data blocks can be written to the base volume 214, the preexisting data blocks in the base volume 214 that are to be overwritten by the new data blocks must be copied to the snapshot repository 220 according to the procedure 276.

The procedure 276 and the first write request 278 start at step 388. The write-ahead log 258 (FIG. 5) for the target logical volume 202 (FIG. 4) (e.g. the snapshot repository 220 in the RAM 204 and the copied snapshot repository 228 in the storage devices 212, FIG. 4) is obtained at step 390, so the entries can be made to the write-ahead log 258. For the shadow directory technique, a copy of the root directory 368 (FIGS. 6–11 and 13) is made (step 392) from the directory cluster 304 (FIG. 13) to the directory cluster 306 (FIG. 13) in the snapshot repository 220, but not in the copied snapshot repository 228. The root directory 368 is also modified (step 392) in the snapshot repository 220, but not in the copied snapshot repository 228, to account for the addition of the new level 2 and 3 directories 378 and 380 (FIG. 7) for locating the new data block 288 (FIG. 7). Nothing needs to be logged into the write-ahead log 258 with respect to the copying and modifying of the root directory 368 at step 392 because no new directory cluster had to be allocated for the step 392 and the following allocations of the lower-level directory clusters and the data cluster will indicate the modifications that need to be made to the root directory 368 if the write-ahead log 258 is later used to recover from a failure.

A pair of directory clusters 330 and 332 (FIG. 13) for the new level 2 directory 378 (FIG. 7) is allocated (step 394) in the snapshot repository 220 (FIG. 4), but not in the copied snapshot repository 228 (FIG. 4). The allocation of the new level 2 directory 378 is logged (step 396) in the write-ahead log 258 (FIG. 5) since a recovery procedure would need information regarding the clusters 330 and 332 that were allocated. Another pair of directory clusters 334 and 336 (FIG. 13) for the new level 3 directory 380 (FIG. 7) is allocated (step 398) in the snapshot repository 220, but not in the copied snapshot repository 228. The allocation of the new level 3 directory 380 is logged (step 400) in the write-ahead log 258.

The data cluster 338 (FIG. 13) for the data block 288 (FIG. 7) is allocated (step 402) in the snapshot repository 220 (FIG. 4). The data cluster 338 is also allocated in the copied snapshot repository 228 (FIG. 4) since the data, unlike the directories, will be immediately copied to the storage devices 212 (FIG. 4). The copying of the data block from the base volume 214 (FIG. 4) to the data cluster 338 in the snapshot repository 220 and the copied snapshot repository 228 is started at step 402. The writing of the new data block 288 at data cluster 338 is logged (step 404) into the write-ahead log 258 (FIG. 5).

For the purpose of this example, the second write request 280, for writing the data block 290 (FIG. 8), starts at step 406. The write-ahead log 258 (FIG. 5) is obtained at step 408. For the shadow directory technique, the root directory 368 (FIGS. 6–11 and 13) does not have to be copied again, since it was copied at step 392 for the first write request 278 and has not yet been written to the storage devices 212 (FIG. 4). The root directory 368 is modified (step 410, FIG. 12B) in the snapshot repository 220, but not in the copied snapshot repository 228. Copies of the level 2 and 3 directories 372 and 376 (FIGS. 8 and 13), however, are made (steps 412 and 414, respectively) from the directory clusters 320 and 324 (FIG. 13), respectively, to the directory clusters 322 and 326 (FIG. 13), respectively, in the snapshot repository 220, but not in the copied snapshot repository 228. The level 2 and 3 directories 372 and 376 are also modified at steps 412 and 414, respectively, for locating the new data block 290. Nothing needs to be logged into the write-ahead log 258 with respect to the modifying of the root directory 368 at step 410 or the copying and modifying of the level 2 and 3 directories 372 and 376 at steps 412 and 414 because no new directory cluster had to be allocated for the steps 410, 412 and 414 and the following allocation of the data cluster will indicate the modifications that need to be made to the root directory 368 and the level 2 and 3 directories 372 and 376 if the write-ahead log 258 is later used to recover from a failure.

The data cluster 340 (FIG. 13) is allocated (step 416) for the data block 290 (FIGS. 8 and 13) in the snapshot repository 220 (FIG. 4). The data cluster 340 is also allocated in the copied snapshot repository 228 (FIG. 4) since the data, unlike the directories, will be immediately copied to the storage devices 212 (FIG. 4). The copying of the data block from the base volume 214 (FIG. 4) to the data cluster 340 in the snapshot repository 220 and the copied snapshot repository 228 is started at step 416. The writing of the new data block 290 at data cluster 340 is logged (step 418) into the write-ahead log 258 (FIG. 5).

For the purpose of this example, the third write request 282, for writing the data block 292 (FIG. 9), starts at step 420. The write-ahead log 258 (FIG. 5) is obtained at step 422. For the shadow directory technique, the root directory 368 (FIGS. 6–11 and 13) does not have to be copied again, since it was copied at step 392 (FIG. 12A) for the first write request 278 and has not yet been written to the storage devices 212 (FIG. 4). The root directory 368 is modified (step 424) in the snapshot repository 220, but not in the copied snapshot repository 228. A copy of the level 2 directory 370 (FIGS. 9 and 13), however, is made (step 426) from the directory cluster 308 (FIG. 13) to the directory cluster 310 (FIG. 13) in the snapshot repository 220, but not in the copied snapshot repository 228. The level 2 directory 370 is also modified at step 426 for locating the new directory 382 (FIGS. 9 and 13) and the new data block 292. Nothing needs to be logged into the writeahead log 258 with respect to the modifying of the root directory 368 at step 424 or the copying and modifying of the level 2 directory 370 at step 426 because no new directory cluster had to be allocated for the steps 424 and 426 and the following allocation of the new directory and data clusters will indicate the modifications that need to be made to the root directory 368 and the level 2 directory 370 if the write-ahead log 258 is later used to recover from a failure.

A pair of directory clusters 342 and 344 (FIG. 13) for the new level 3 directory 382 (FIGS. 9 and 13) is allocated (step 428) in the snapshot repository 220 (FIG. 4), but not in the copied snapshot repository 228 (FIG. 4). The allocation of the new level 3 directory 382 is logged (step 430, FIG. 12C) in the write-ahead log 258 (FIG. 5).

The data cluster 346 (FIG. 13) is allocated (step 432) for the data block 292 (FIG. 9) in the snapshot repository 220 (FIG. 4). The data cluster 346 is also allocated in the copied snapshot repository 228 (FIG. 4) since the data, unlike the directories, will be immediately copied to the storage devices 212 (FIG. 4). The copying of the data block from the base volume 214 (FIG. 4) to the data cluster 346 in the snapshot repository 220 and the copied snapshot repository 228 is started at step 432. The writing of the new data block 292 at data cluster 346 is logged (step 434) into the write-ahead log 258 (FIG. 5).

For the purpose of this example, the copying of the data block 288 (FIGS. 7 and 13) to data cluster 338 (FIG. 13) that was begun at step 402 (FIG. 12A) completes at step 436, so the write-ahead log 258 (FIG. 5) entries for the first write request 278 are ordered "flushed," or written, to the copied snapshot repository 228 (FIG. 4) in the storage devices 212 (FIG. 4). The completion of the copying at step 436 for the first write request 278 is logged (step 438) into the write-ahead log 258. The "flush" ordered at step 436 of the entries for the first write request 278 is started at step 440. The entries for the first write request 278 will be written to a cluster 262 (FIG. 5) in the write-ahead log 258. Although the write-ahead log 258 entries for the first write request 278 are being written to the copied snapshot repository 228, the root and level 2 and 3 directories 368, 378 and 380 have not been written to the copied snapshot repository 228 yet, so the write-ahead log 258 will still be needed to recover the first write request 278 in the event of a failure.

In this example, the fourth write request 284, for writing the data blocks 294 and 296 (FIG. 10), starts at step 442. The write-ahead log 258 (FIG. 5) is obtained at step 444. For the shadow directory technique, the root directory 368 (FIGS. 6–11 and 13) does not have to be copied again, since it was copied at step 392 (FIG. 12A) for the first write request 278 and has not yet been written to the storage devices 212 (FIG.

4). The root directory 368 is modified (step 446) in the snapshot repository 220, but not in the copied snapshot repository 228. Nothing needs to be logged into the write-ahead log 258 with respect to the modifying of the root directory 368 at step 446 because no new directory cluster had to be allocated for the step 446 and the following allocation of the new directory and data clusters will indicate the modifications that need to be made to the root directory 368 if the write-ahead log 258 is later used to recover from a failure.

A pair of directory clusters 348 and 350 (FIG. 13) for the new level 2 directory 384 (FIGS. 10 and 13) is allocated (step 448) in the snapshot repository 220 (FIG. 4), but not in the copied snapshot repository 228 (FIG. 4). The allocation of the new level 2 directory 384 is logged (step 450, FIG. 12D) in the write-ahead log 258 (FIG. 5). Another pair of directory clusters 352 and 354 (FIG. 13) for the new level 3 directory 386 (FIGS. 10 and 13) is allocated (step 452) in the snapshot repository 220 (FIG. 4), but not in the copied snapshot repository 228 (FIG. 4). The allocation of the new level 3 directory 386 is logged (step 454) in the write-ahead log 258 (FIG. 5).

In this example, the copying of the data block 290 (FIGS. 8 and 13) to data cluster 340 (FIG. 13) that was begun at step 416 (FIG. 12B) completes at step 456, so the write-ahead log 258 (FIG. 5) entries for the second write request 280 are a ordered "flushed" to the copied snapshot repository 228 (FIG. 4) in the storage devices 212 (FIG. 4). The completion of the copying at step 456 for the second write request 280 is logged (step 458) into the write-ahead log 258. The "flush" to a cluster 262 (FIG. 5) in the write-ahead log 258 of the entries for the second write request 280 does not start yet, since the flush of the entries for the first write request 278 started at step 440 (FIG. 12C) has not completed yet.

The data cluster 356 (FIG. 13) is allocated (step 460) for the data block 294 (FIG. 10) in the snapshot repository 220 (FIG. 4) and in the copied snapshot repository 228 (FIG. 4). The copying of the data block from the base volume 214 (FIG. 4) to the data cluster 356 in the snapshot repository 220 and the copied snapshot repository 228 is started at step 460. The writing of the new data block 294 at data cluster 356 is logged (step 462) into the write-ahead log 258 (FIG. 5). Since the fourth write request 284 writes two data blocks 294 and 296, the data cluster 358 (FIG. 13) is allocated (step 464) for the data block 296 (FIG. 10) in the snapshot repository 220 (FIG. 4) and in the copied snapshot repository 228 (FIG. 4). The copying of the data block from the base volume 214 (FIG. 4) to the data cluster 358 in the snapshot repository 220 and the copied snapshot repository 228 is started at step 464. The writing of the new data block 296 at data cluster 358 is logged (step 466) into the write-ahead log 258 (FIG. 5).

In this example, the copying of the data block 292 (FIGS. 9 and 13) to data cluster 346 (FIG. 13) that was begun at step 432 (FIG. 12C) completes at step 468 (FIG. 12E), so the write-ahead log 258 (FIG. 5) entries for the third write request 282 are ordered "flushed" to the copied snapshot repository 228 (FIG. 4) in the storage devices 212 (FIG. 4). The completion of the copying at step 468 for the third write request 282 is logged (step 470) into the write-ahead log 258. The flush of the entries for the first write request 278 started at step 440 (FIG. 12C) completes at step 472. Therefore, the "flushes" to a cluster 262 (FIG. 5) in the write-ahead log 258 of the entries for the second and third write requests 280 and 282 ordered at steps 456 and 468, respectively, start together at step 474. For the first write request 278, the flush of the write-ahead log 258 has completed (step 476), so the first write request 278 passes (step 476) to the base volume 214 (FIG. 4). Thus, the base volume 214 can proceed to overwrite the data block that was copied to the snapshot repository 220 (FIG. 4). With respect to the snapshot repository 220, therefore, the first write request 278 ends (step 478).

For the fourth write request 284, the copying of the data block 296 (FIGS. 10 and 13) to the data cluster 358 (FIG. 13) that was started at step 464 (FIG. 12D) completes at step 480. However, the entries in the write-ahead log 258 (FIG. 5) for the fourth write request 284 are not yet flushed to the copied snapshot repository 228, since the copying of the other data block 294 (FIGS. 10 and 13) that was started at step 460 (FIG. 12D) has not completed yet. The completion of the copying of the data block 296 is logged (step 482) in the write-ahead log 258.

The fifth write request 286 in this example, for writing the data block 298 (FIG. 11), starts at step 484. The write-ahead log 258 (FIG. 5) is obtained at step 486. For the shadow directory technique, the root directory 368 (FIGS. 6–11 and 13) does not have to be copied again, since it was copied at step 392 for the first write request 278 and has not yet been written to the storage devices 212 (FIG. 4). The root directory 368 is modified (step 488) in the snapshot repository 220, but not in the copied snapshot repository 228. Copies of the level 2 and 3 directories 378 and 380 (FIGS. 11 and 13), however, are made (steps 490 and 492, respectively, FIG. 12F) from the directory clusters 330 and 334 (FIG. 13), respectively, to the directory clusters 332 and 336 (FIG. 13), respectively, in the snapshot repository 220, but not in the copied snapshot repository 228. The level 2 and 3 directories 378 and 380 are also modified at steps 490 and 492, respectively, for locating the new data block 298. Nothing needs to be logged into the write-ahead log 258 with respect to the modifying of the root directory 368 at step 488 or the copying and modifying of the level 2 and 3 directories 378 and 380 at steps 490 and 492 because no new directory cluster had to be allocated for the steps 488, 490 and 492 and the following allocation of the data cluster will indicate the modifications that need to be made to the root directory 368 and the level 2 and 3 directories 378 and 380 if the write-ahead log 258 is later used to recover from a failure.

The data cluster 360 (FIG. 13) is allocated (step 494) for the data block 298 (FIGS. 11 and 13) in the snapshot repository 220 (FIG. 4). The data cluster 360 is also allocated in the copied snapshot repository 228 (FIG. 4) since the data, unlike the directories, will be immediately copied to the storage devices 212 (FIG. 4). The copying of the data block from the base volume 214 (FIG. 4) to the data cluster 360 in the snapshot repository 220 and the copied snapshot repository 228 is started at step 494. The writing of the new data block 298 at data cluster 360 is logged (step 496) into the write-ahead log 258 (FIG. 5).

The flush of the entries for the second and third write requests 280 and 282 started at steps 456 (FIG. 12D) and 468 (FIG. 12E), respectively, completes at step 498. For the second write request 280, the flush of the write-ahead log 258 has completed (step 500), so the second write request 280 passes (step 500) to the base volume 214 (FIG. 4). Thus, the base volume 214 can proceed to overwrite the data block that was copied to the snapshot repository 220 (FIG. 4) for the second write request 280. With respect to the snapshot repository 220, therefore, the second write request 280 ends (step 502). For the third write request 282, the flush of the write-ahead log 258 has completed (step 504), so the third write request 282 passes (step 504) to the base volume 214

(FIG. 4). Thus, the base volume 214 can proceed to overwrite the data block that was copied to the snapshot repository 220 (FIG. 4) for the third write request 282. With respect to the snapshot repository 220, therefore, the third write request 282 ends (step 506).

In this example, the copying of the data block 298 (FIGS. 11 and 13) to data cluster 360 (FIG. 13) that was begun at step 494 completes at step 508, so the write-ahead log 258 (FIG. 5) entries for the fifth write request 286 are ordered "flushed" to the copied snapshot repository 228 (FIG. 4) in the storage devices 212 (FIG. 4). The completion of the copying at step 508 for the fifth write request 286 is logged (step 510) into the write-ahead log 258. Since there is no other flush of any part of the write-ahead log 258 currently being performed, the flush ordered at step 508 of the entries for the fifth write request 286 is started at step 512 (FIG. 12G). The entries for the fifth write request 286 will be written to a cluster 262 (FIG. 5) in the write-ahead log 258.

The copying of the data block 294 (FIGS. 10 and 13) to data cluster 356 (FIG. 13) that was begun at step 460 completes at step 514, so the write-ahead log 258 (FIG. 5) entries for the fourth write request 284 are ordered "flushed" to the copied snapshot repository 228 (FIG. 4) in the storage devices 212 (FIG. 4), since the copying of the other data block 296 (FIGS. 10 and 13) for the fourth write request 284 was already completed at step 480 (FIG. 12E). The completion of the copying at step 514 for the fourth write request 284 is logged (step 516) into the write-ahead log 258.

The flush of the entries for the fifth write request 286 started at step 512 completes at step 518. Therefore, the "flush" to a cluster 262 (FIG. 5) in the write-ahead log 258 of the entries for the fourth write request 284 ordered at step 514 starts at step 520. For the fifth write request 286, the flush of the write-ahead log 258 has completed (step 522), so the fifth write request 286 passes (step 522) to the base volume 214 (FIG. 4). Thus, the base volume 214 can proceed to overwrite the data block that was copied to the snapshot repository 220 (FIG. 4) for the fifth write request 286. With respect to the snapshot repository 220, therefore, the fifth write request 286 ends (step 524).

The flush of the entries for the fourth write request 284 started at step 520 completes at step 526. For the fourth write request 284, the flush of the write-ahead log 258 has completed (step 528), so the fourth write request 284 passes (step 528) to the base volume 214 (FIG. 4). Thus, the base volume 214 can proceed to overwrite the two data blocks that were copied to the snapshot repository 220 (FIG. 4) for the fourth write request 284. With respect to the snapshot repository 220, therefore, the fourth write request 284 ends (step 530).

For each of the write requests 278–286 (FIGS. 12A–G), the write request 278–286 could terminate and pass to the base volume 214 (FIG. 4) without regard to whether any other write requests were active and modifying the same directories. Thus, the use of the write-ahead log 258 (FIG. 5) in block-level data transactions provides an improvement over the prior art illustrated in FIGS. 1–3, wherein write requests had to be delayed when other write requests were modifying the same directories.

At some point, the directories 368, 370, 372, 374, 376, 378, 380, 382, 384 and 386 (FIGS. 6–11) must be written, or "flushed," to the copied snapshot repository 228 (FIG. 4) in the storage devices 212 (FIG. 4) for any reason, including when the write-ahead log 258 (FIG. 5) reaches a "fullness" threshold, the time since the last directory flush reaches a time threshold or a conventional cache synchronization request is made, among others. An exemplary procedure 532 for flushing the directories to the storage devices 212 is shown in FIG. 14. The procedure 532 starts at step 534. The logical volume 202 (FIG. 4) is quiesced (step 536), i.e. access requests directed to the logical volume 202 are temporarily suspended. All of the lower level (e.g. levels 2 and 3, FIGS. 6–11) directories are written (step 538) to the copied logical volume 210 (FIG. 4). All of the writes to the lower level directories are allowed to complete (step 540). Then the root directory 368 is written (step 542) to the storage devices 212. The write of the root directory 368 effectively "activates" the lower level directories that were written at step 538 as described in the shadow directory technique of the second aforementioned patent application. The write to the root directory 368 is allowed to complete (step 544). The writing of the root and lower level directories is logged (step 546) in the write-ahead log 258. This logging serves as a type of "checkpoint" at which the directories in both the RAM 204 (FIG. 4) and the storage devices 212 (FIG. 4) correlate with the information in the write-ahead log 258. Then the write-ahead log 258 is flushed (step 548) to the storage devices 212. The flushing of the write-ahead log 258 is allowed to complete (step 550). The logical volume 202 is released (step 552) from quiescence. The procedure 532 ends at step 554.

At some point, it may be necessary to recover the logical volume 202 (FIG. 4) from the state of the copied logical volume 210 (FIG. 4) and the write-ahead log 258 (FIG. 5) after a failure that caused a loss of the logical volume 202 in the RAM 204 (FIG. 4). An exemplary recovery procedure 556 is shown in FIG. 15. The procedure 556 starts at step 558. The most recent root directory 368 (FIGS. 6–11 and 13) is determined at step 560, and the most recent checkpoint in the write-ahead log 258 is determined at step 562. The most recent root directory 368 can be determined because, when the root directory 368 is written at step 542 (FIG. 14) of the directory flushing procedure 532 (FIG. 14), the root directory 368 is "stamped" with an identifier, e.g. the time or a number, with which the most recent root directory 368 can be determined. Likewise, when the writing of the directories is logged in the write-ahead log 258 at step 546 (FIG. 14) of the directory flushing procedure 532, the write-ahead log 258 is also "stamped" with such an identifier, which identifies the most recent checkpoint in the write-ahead log 258. If the identifier is a number, then the identifier is incremented each time the directory flushing procedure 532 is performed.

If the checkpoint identifier and the root directory identifier are the same (step 564), then the failure evidently occurred sometime after a successful flush of the directories and the write-ahead log (i.e. after step 550 of the directory flushing procedure 532, FIG. 14) and before the next running of the directory flushing procedure 532. In this case, the recovery is performed by processing (step 566) any entries in the write-ahead log 258 (FIG. 5) that were logged after the checkpoint. If the checkpoint identifier and the root directory identifier are not the same (step 564), but the checkpoint identifier plus one is the same as the root directory identifier (step 568), then the failure evidently occurred sometime between the writing of the root directory 368 (FIGS. 6–11 and 13) at step 542 (FIG. 14) of the directory flushing procedure 532 and the flushing of the write-ahead log 258 at step 548 (FIG. 14) of the directory flushing procedure 532. In this case, the recovery is performed by re-writing (step 570) the checkpoint identifier and performing steps 546 and 548 of the directory flushing procedure 532. If neither the checkpoint identifier nor the checkpoint identifier plus one is the same as the root directory identifier, then the write-ahead log 258 and/or the root directory 368 contains bad, invalid or corrupted metadata. In this case, the logical volume 202 (FIG. 4) must be set offline (step 572), so it cannot be used. The administrator of the computerized data storage system 200 (FIG. 4) should be notified of an unrecoverable error. The recovery procedure 556 ends at step 574.

The use of the write-ahead log enables greater concurrency and efficiency for block-level data access than does the prior art. Concurrent access requests are allowed to complete independently of other access requests that are modifying the same logical volume, instead of having to wait for all of the access requests to complete at the same time. Thus, the overall performance of the access requests and of the storage system is enhanced.

Presently preferred embodiments of the invention and its improvements have been described with a degree of particularity. This description has been made by way of preferred example. It should be understood that the scope of the present invention is defined by the following claims, and should not be unnecessarily limited by the detailed description of the preferred embodiments set forth above.

The invention claimed is:

1. A method of managing block-level storage in a computerized storage unit connected to a source of access requests comprising the steps of:

receiving a write access request directed to a volume of data in said computerized storage unit having a main memory that contains said volume of data and a storage device containing a copy of said volume of data, said volume of data containing data clusters of data blocks received in said write access request, and said copy of said volume of data containing copies of said data clusters, copies of directory clusters and a copy of a log of entries;

locating said data clusters and said log of entries describing updates to said volume of data in said directory clusters;

performing a block-level write of said data cluster in said main memory and a corresponding copy of said data cluster in said storage device;

updating at least one said directory cluster in said main memory that locates said data cluster;

performing a block-level write to said copied data cluster in said storage device;

recording into said log of entries in said main memory a description of said block-level writes to said data cluster in said main memory and said copied data cluster in said storage device, said description identifying at least one said directory cluster updated in said main memory;

writing said recorded description from said log of entries in said main memory to said copied log of entries in said storage device, said write access request being deemed completed upon writing said recorded description to said copied log of entries;

making a copy of said at least one directory cluster in said main memory before updating said at least one directory;

updating said copy of said at least one directory in said main memory;

allocating said data cluster for said block-level write in said main memory and said copied data cluster in said storage device before performing said block-level writes to said data cluster or said copied data cluster;

recording into a portion of said log a description for said allocating of said data cluster and said block-level writing to said data cluster and said copied data cluster;

writing said portion of said log to said storage device, wherein said portion of said log first aforesaid is a first portion of said log, and further comprising the steps of:

quiescing said volume;

writing said updated at least one directory cluster to said storage device;

logging into a second portion of said log a description of said writing of said updated at least one directory cluster;

writing said second portion of said log to said storage device; and releasing said volume from quiescence.

2. A method as defined in claim 1 comprising the further step of:

signaling completion of said write request after writing said first portion of said log to said storage device and before writing said updated at least one directory cluster to said storage device.

3. A method of managing block-level storage in a computerized storage unit connected to a source of access requests comprising the steps of:

receiving a write access request directed to a volume of data in said computerized storage unit having a main memory that contains said volume of data and a storage device containing a copy of said volume of data, said volume of data containing data clusters of data blocks received in said write access request, and said copy of said volume of data containing copies of said data clusters, copies of directory clusters and a copy of a log of entries, wherein said write access request first aforesaid is a first write access request, said at least one directory cluster first aforesaid is a first at least one directory cluster, said portion of said log first aforesaid is a first portion of said log, said data cluster first aforesaid is a first data cluster, further comprising the steps of:

receiving a second write access request directed to said volume to perform a second block-level write of a second data cluster in said main memory and a corresponding second copied data cluster in said storage device;

identifying a second at least one directory cluster in said main memory that locates said second data cluster;

determining whether said second at least one directory cluster is also said first at least one directory cluster;

upon determining that said second at least one directory cluster is not also said first at least one directory cluster, making a copy of said second at least one directory cluster in said main memory;

allocating said second data cluster for said second block-level write in said main memory and said second copied data cluster in said storage device;

performing said second block-level write to said second data cluster in said main memory;

updating said second at least one directory cluster in said main memory;

performing said second block-level write to said second copied data cluster in said storage device;

recording into a second portion of said log a description for said allocating of said second data cluster and said block-level writing to said second data cluster and said second copied data cluster; and writing said first and second portions of said log to said storage device;

locating said data clusters and said log of entries describing updates to said volume of data in said directory clusters;

performing a block-level write of said data cluster in said main memory and a corresponding copy of said data cluster in said storage device;

updating at least one said directory cluster in said main memory that locates said data cluster;

performing a block-level write to said copied data cluster in said storage device;

recording into said log of entries in said main memory a description of said block-level writes to said data cluster in said main memory and said copied data cluster in said storage device, said description identifying at least one said directory cluster updated in said main memory; and writing said recorded description from said log of entries in said main memory to said copied log of entries in said storage device, said write access request being deemed completed upon writing said recorded description to said copied log of entries.

4. A method as defined in claim 3 comprising the further step of:

signaling completion of said first and second write access requests after writing said first and second portions of said log to said storage device.

5. A computerized storage system comprising:

a controller that is operative according to software to control functions of said computerized storage system including management of a volume of data for block-level data storage, said volume containing data clusters of blocks of data directory clusters locating said blocks of data in said data clusters and a log of block-level updates to said data clusters and said directory clusters in said volume, said controller being operative to make said block-level updates to said data clusters and said directory clusters and to record said block-level updates in said log in response to a write request received from a request source connected to said computerized storage system;

a main memory connected to said controller containing said volume containing said data clusters, said directory clusters and said log, said block-level updates being made to said data clusters and said directory clusters in said main memory, said log containing entries of descriptions of said block-level updates made in said main memory; and a storage device connected to said main memory and said controller containing a copy of said volume containing said data clusters, said directory clusters and said log, said block-level updates being made to said data clusters in said copy of said volume in said storage device, said log contained in said copy of said volume in said storage device containing copies of said entries of said descriptions of said block-level updates made in said main memory;

and wherein said controller is further operative to make copies of said directory clusters in said main memory and wherein said controller is further operative to quiesce said volume in said main memory and said copy of said volume in said storage device before copying said updated directory clusters to said copy of said volume in said storage device and to record said copying of said updated directory clusters before releasing said volume in said main memory and said copy of said volume in said storage device from quiescence.

6. A computerized storage system as defined in claim 5 wherein:

said controller is further operative to signal completion of said write request to said request source after copying said entries in said log from said volume in said main memory to said copy of said volume in said storage device and before copying said updated directory clusters to said copy of said volume in said storage device.

* * * * *